(12) United States Patent
Alfano et al.

(10) Patent No.: US 10,858,093 B2
(45) Date of Patent: Dec. 8, 2020

(54) THICK AIRFOIL SHAPES FOR BLADE NECKS AND FOR BLADE CUFF FAIRINGS FOR AN AIRCRAFT ROTOR

(71) Applicant: AIRBUS HELICOPTERS, Marignane (FR)

(72) Inventors: David Alfano, Velaux (FR); Damien Desvigne, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 117 days.

(21) Appl. No.: 16/166,545

(22) Filed: Oct. 22, 2018

(65) Prior Publication Data
US 2019/0193851 A1 Jun. 27, 2019

(30) Foreign Application Priority Data
Dec. 22, 2017 (FR) ...................... 17 71420

(51) Int. Cl.
*B64C 27/48* (2006.01)
*B64C 27/467* (2006.01)
*B64C 11/18* (2006.01)

(52) U.S. Cl.
CPC ............ *B64C 27/467* (2013.01); *B64C 11/18* (2013.01); *B64C 27/48* (2013.01); *F05D 2260/81* (2013.01)

(58) Field of Classification Search
None
See application file for complete search history.

(56) References Cited

U.S. PATENT DOCUMENTS 3,653,151 A * 4/1972 Laurent .................. A63H 27/00
446/66
3,950,115 A 4/1976 Euler
4,592,701 A 6/1986 Hahn et al.
(Continued)

FOREIGN PATENT DOCUMENTS

EP 0149021 A2 7/1985
EP 0149021 A3 8/1985
(Continued)

OTHER PUBLICATIONS

Korean Notice of Preliminary Rejection dated Oct. 21, 2019, Application No. 10-2018-0129039, Applicant Airbus Helicopters, 4 Pages.
(Continued)

*Primary Examiner* — Michael Lebentritt
(74) *Attorney, Agent, or Firm* — Brooks Kushman P.C.

(57) ABSTRACT

A thick airfoil shape that is to form a blade neck for blades, the blade neck connecting a blade root to a streamlined portion of the blade, and/or a blade cuff connecting a blade to the hub of an aircraft rotor. The thick airfoil shape has a leading edge and a trailing edge together with thick airfoil profiles for which the particular positions of points defining the maximum thickness of each airfoil profile make it possible to improve the aerodynamic behavior of the thick airfoil shapes and of the rotor during rotation of the rotor while the aircraft is advancing, for the blade both when it is advancing and when it is retreating. The thick airfoil shape also serves to reduce the vibration as generated by a wake from the rotor on a tail boom or a horizontal and/or vertical stabilizer of the aircraft.

20 Claims, 8 Drawing Sheets

(56) References Cited

U.S. PATENT DOCUMENTS

| | | | |
|---|---|---|---|
| 4,911,612 A | 3/1990 | Rodde et al. | |
| 4,975,021 A | 12/1990 | Wagner et al. | |
| 5,242,267 A | 9/1993 | Byrnes et al. | |
| 5,474,425 A | 12/1995 | Lawlor | |
| 6,361,279 B1 | 3/2002 | Rodde et al. | |
| 9,359,071 B2 | 6/2016 | Kuntze-Fechner et al. | |
| 9,611,833 B2 | 4/2017 | Madsen et al. | |
| 2012/0057987 A1 | 3/2012 | Fuglsang et al. | |
| 2012/0138731 A1* | 6/2012 | Alfano | B64C 1/0009 244/17.21 |
| 2016/0137296 A1* | 5/2016 | Alfano | B64C 27/001 416/223 R |
| 2017/0174340 A1* | 6/2017 | Leusink | B64C 27/463 |

FOREIGN PATENT DOCUMENTS

| | | |
|---|---|---|
| EP | 0351577 A2 | 1/1990 |
| EP | 0351577 A3 | 10/1990 |
| EP | 2593670 B1 | 1/2017 |
| FR | 2252916 A1 | 6/1975 |
| FR | 2626841 A1 | 8/1989 |
| FR | 2765187 A1 | 12/1998 |
| GB | 1427158 | 3/1976 |
| KR | 100207361 B1 | 7/1999 |

OTHER PUBLICATIONS

French Search Report for Application No. 1771420, Completed by the French Patent Office, dated Aug. 8, 2018, 7 pages.

Website: https://ntrs.nasa.gov/archive/nasa/casi.ntrs.nasa.gov/19860006254.pdf; Mod-5A Wind Turbine Generator Program Design Report, vol. III—Final Design and System Description Book 1, Published Aug. 1984, 590 Pages.

Korean Notice of Final Rejection Dated Mar. 30, 2020, (with English Translation), Application No. 10-2018-0129039, Applicant Airbus Helicopters, 7 Pages.

* cited by examiner

THICK AIRFOIL SHAPES FOR BLADE NECKS AND FOR BLADE CUFF FAIRINGS FOR AN AIRCRAFT ROTOR

CROSS-REFERENCE TO RELATED APPLICATIONS

This application claims priority to French patent application No. FR 1771420 filed on Dec. 22, 2017, the disclosure of which is incorporated in its entirety by reference herein.

BACKGROUND OF THE INVENTION

(1) Field of the Invention

The present invention relates to airfoil surfaces, and more particularly to airfoil surface forming a rotary wing.

The present invention relates to a thick airfoil shape for forming a blade neck or a blade cuff, and also to a rotor having such a thick airfoil shape and to a rotary wing aircraft having such a rotor. The present invention also relates to a method of obtaining such a thick airfoil shape.

2) Description of Related Art

A rotary wing aircraft has a fuselage carrying one or more lift rotors. The fuselage is extended longitudinally rearwards by a tail boom that can be used to carry one or more stabilizers for providing aerodynamic stability to the aircraft and also a tail rotor for countering torque in yaw. A rotary wing aircraft may also have rotors on either side of the fuselage, constituting propulsive propellers and enabling high speeds of advance to be obtained. Such aircraft are generally referred to as "hybrid helicopters".

Each rotor, whether a lift rotor, an anti-torque tail rotor, or indeed a propulsive propeller, comprises a rotary hub and a plurality of blades. Each blade is connected to the hub and is driven in rotation by the hub.

Conventionally, such a blade extends longitudinally spanwise from a first end referred to as a "blade root" that is to be fastened to the hub, to a second end that is free. It should be observed that the term "longitudinal" should be understood in the span direction of the blade. Furthermore, the blade extends transversely from a leading edge to a trailing edge along chords of the blade. In particular, the blade comprises an outer covering and successive cross-sections that are positioned radially spanwise at respective given rotor radii relative to the center of rotation of the rotor. Each cross-section is defined by an airfoil profile.

The blade comprises the blade root, a streamlined portion, and a blade neck connecting the blade root to the start radius of the streamlined portion. The streamlined portion provides substantially all of the aerodynamic performance of the blade and in particular the lift of the blade, the streamlined portion representing a portion of the blade of greater or lesser length. The term "start radius" is used of the streamlined portion to mean the radius of the blade at which there begin to be airfoil profiles that have a narrow or tapering trailing edge.

By way of example, existing airfoil profiles that are frequently used for the streamlined portion of aircraft rotor blades are defined in families by bodies such as the National Advisory Committee for Aeronautics (NACA) or Onéra (OA) [the French national office for aerospace research], where OA families are described for example in Documents FR 2 626 841 and FR 2 765 187.

Conventionally, the cross-sections of the blade neck are defined firstly by the geometrical junction between the blade root and the start of the streamlined portion, and secondly by imposing a thick airfoil shape on the blade neck.

A blade is connected to the hub of the rotor by a structural junction device that may be faired in order in particular to reduce its aerodynamic drag and the wake it generates. Such a structural junction device is generally referred to as a "cuff".

A rotary wing aircraft presents the advantage of being capable of flying both at high speeds of advance in cruising flight and at very low speeds of advance, and also of being capable of hovering.

During rotation of the rotor and during forward flight of the aircraft, a blade is said to be an "advancing" blade when its rotation moves it from the rear of the aircraft towards the front of the aircraft. In contrast, a blade is said to be a "retreating" blade when its rotation moves it from the front of the aircraft towards the rear of the aircraft.

While hovering or while flying at very low speeds of advance, each blade, regardless of whether it is advancing or retreating, is swept by a substantially identical air stream as generated mainly by the rotation of the rotor, and consequently by the rotation of the blade. This air stream causes aerodynamic forces to appear, and in particular a lift aerodynamic force for keeping the aircraft in the air.

During forward flight at higher speeds of advance, each blade is swept by two air streams. Firstly, a first air stream is generated by the rotation of the rotor, and secondly a second air stream is generated by the aircraft advancing. For an advancing blade, these two air streams act together, whereas for a retreating blade, these two air streams are in opposition. These two air streams cause aerodynamic forces to appear, and in particular an aerodynamic lift force for keeping the aircraft in the air and possibly also for propelling it, together with an aerodynamic drag force tending to oppose forward movement of the aircraft.

Furthermore, a rotor passing through the second air stream generated by the aircraft advancing gives rise to a wake being produced at the rear of the rotor. This wake can present unsteadinesses of large amplitude and a frequency signature of harmonic type, of broadband type, or indeed a superposition of both. These unsteadinesses are due in particular to the shapes of the elements constituting the central portion of the rotor, namely the hub, the blade necks, and the cuffs, to their aerodynamic interactions with the two air streams, and also to the rotation of the blades and of the cuffs and their orientations relative to the air stream as it varies during such rotation, and especially in a particular zone of the rotor referred to as a "reverse flow region".

These unsteadinesses, as a result of their impacts on elements of the aircraft situated behind the main rotor, and in particular on the tail boom and on the horizontal or vertical stabilizers of the aircraft, have the particular consequences of reducing the flying qualities of the aircraft, with elements that are situated behind the main rotor being fed with air that is highly disturbed, and also of vibrations appearing in those elements, which phenomenon is also known as "tail-shake". The vibrations are then transmitted to the cabin of the aircraft by the structure of the aircraft, thereby generating discomfort for the crew, and possibly also damaging on-board equipment.

The reverse flow region is the zone in which the local speed of the first air stream due to the rotation of the blade is less than the speed in translation of the second air stream due to the aircraft advancing. This reverse flow region is situated in the azimuth sector corresponding to a retreating blade, close to the hub of the rotor. This reverse flow region generally has an impact on the blade cuff, on the blade neck, and also on a longer or shorter fraction of the streamlined portion of the blade, depending on the advance ratio, where the advance ratio is defined as the ratio of the speed of advance of the aircraft divided by the speed component at the tip of the blade due solely to rotation of the rotor: the greater this advance ratio, the greater the span and the azimuth of the reverse flow region.

Furthermore, the angle of incidence of the second air stream generated by the advancing aircraft on these elements of the rotor close to the hub can be modified by the presence, in the proximity of these elements of the rotor, of the aircraft fuselage, and in particular of covers protecting its power plant. Under such circumstances, the combined air stream sweeping over these rotor elements close to the hub can have its angle of incidence increased both for an advancing blade and for a retreating blade, typically through an angle of 0 to 10 degrees.

Consequently, the rotor elements included in the reverse flow region are subjected during their combined movements of rotation about the hub and in translation associated with the aircraft advancing to a combined air stream that impacts against them via the trailing edge in the reverse flow region at an angle of incidence that is positive and that can be large. Consequently, the shapes of these elements of the rotor included in the reverse flow region are generally not suited to this incident relative wind in reverse and their aerodynamic behavior is thus degraded. In particular, a large amount of separation of the air stream appears and is accompanied by large values for aerodynamic drag. A wake is also produced on these rotor elements and unsteadinesses characteristics of the wake appear.

Outside the reverse flow region, and for an advancing blade, the combined air stream impacts in conventional manner against the elements of the rotor via its leading edge, giving rise to the expected aerodynamic behavior of these elements. Nevertheless, in the proximity of the hub, the angle of incidence of this combined air stream can be significant. Consequently, the shapes of these rotor elements in the proximity of the hub are generally not appropriate, and considerable aerodynamic drag can appear, possibly in association with a wake.

Furthermore, these phenomena can be amplified with hybrid helicopters. Specifically, at high speeds of advance, a hybrid helicopter may reduce the speed of rotation of the rotor. As a result, the incident local wind in reverse impacts the trailing edges of those rotor elements that are included in the reverse flow region at increased speed.

The streamlined portion of the blade is generally formed by a so-called "thin" airfoil shape, the relative thickness of each airfoil profile of this thin shape possibly being less than or equal to 13%. It should be recalled that the relative thickness of a profile is the ratio of the maximum thickness of that profile divided by its chord, where its chord is the distance between the leading edge and the trailing edge of the profile. This relative thickness is expressed herein as a percentage. The neck of the blade and the cuff, when faired, are generally formed by so-called "thick" shapes for which the relative thickness is greater, e.g. lying in the range 20% to 150%.

In particular, the neck of the blade, the root of the blade, and the cuff of the blade, when faired, may each present a thick pseudo-elliptical shape with relative thickness that may, for example, lie in the range 20% to 100% in order to adapt as well as possible to the specific features of the air streams that they are likely to encounter during forward flight in the reverse flow region, i.e. an air stream directed from the leading edge towards the trailing edge on an "advancing" blade and a reverse air stream directed from the trailing edge towards the leading edge on a "retreating" blade. Furthermore, a thick pseudo-elliptical shape also serves to fair the structural junction device between the blade root and the hub of the rotor.

Such a thick airfoil shape does not have a main function of generating an aerodynamic lift force, but rather of providing stiffness and mechanical strength for the blade at a blade neck, or indeed for limiting the aerodynamic drag generated by a cuff that fairs a structural junction device between a blade and the rotor hub. Nevertheless, such thick pseudo-elliptical shapes present drawbacks, such as the appearance of large amounts of air stream separation and unsteadinesses. Furthermore, although aerodynamic drag is indeed reduced compared with a structural junction device that is not faired, it nevertheless remains significant, generally representing 10% to 15% of the total aerodynamic drag generated by a conventional rotary wing aircraft. The term "conventional rotary wing aircraft" is used to cover any aircraft having a lift rotor and an anti-torque tail rotor located at the rear end of a tail boom.

The prior art includes various solutions for improving the aerodynamic behavior of a thick airfoil surface swept by a stream of air.

For example, Documents EP 2 593 670, U.S. Pat. No. 5,474,425, and US 2012/057987 are known, which describe blades for a winded turbine rotor in which the blade root is formed by a thick profile. Nevertheless, those documents are remote from the invention since they relate to blades that are not subjected to reverse air streams.

In the field of rotary wing aircraft, a protuberance may be arranged at the trailing edge and possibly at the leading edge of a cuff of a rotor blade. The protuberance serves to facilitate penetration of the cuff into the air stream and thereby limit the appearance of aerodynamic disturbances both for an advancing blade and for a retreating blade.

BRIEF SUMMARY OF THE INVENTION

An object of the present invention is to reduce the above-mentioned limitations and to limit the aerodynamic disturbances that are generated by a rotor of an aircraft, in particular during forward flight, specifically by reducing the aerodynamic drag of the rotor and by limiting wake production.

The invention provides a thick airfoil shape for arranging between a rotary hub of a rotor of an aircraft and a streamlined portion of each blade of that rotor, the thick airfoil shape serving to reduce air stream separations, aerodynamic drag, and wake production of the thick airfoil shape, both on the advancing side and on the retreating side.

The invention also provides a blade including this thick airfoil shape constituting the neck of the blade. The invention also provides a rotor for a rotary wing aircraft, and a rotary wing aircraft.

The invention also provides a method of obtaining such a thick airfoil shape. The method serves firstly to determine thick airfoil profiles forming such a thick airfoil shape, and secondly to obtain the thick airfoil shape. These thick airfoil profiles are thus taken into account when making the mold used for fabricating the thick airfoil shape, or indeed while machining the thick airfoil shape.

The present invention thus provides a thick airfoil shape for arranging between a rotary hub of a rotor of an aircraft and a streamlined portion of a blade of the rotor, the thick airfoil shape extending firstly spanwise in a longitudinal direction X from a first end zone towards a second end zone, and secondly in a transverse direction Y from a leading edge to a trailing edge, the thick airfoil shape being made up of a succession of thick airfoil profiles situated in planes parallel to a transverse plane $P_{YZ}$ perpendicular to the spanwise longitudinal direction X, each thick airfoil profile having a suction side profile and a pressure side profile, each thick airfoil profile being defined by a chord c between the leading edge and the trailing edge, by a maximum thickness t equal to a maximum distance between the suction side profile and the pressure side profile measured perpendicularly to the chord c, and by a relative thickness t/c equal to the ratio of the maximum thickness t divided by the chord c, the relative thickness t/c being greater than or equal to 20% for each thick airfoil profile.

Each airfoil profile passes via extreme points $C0$, $C1$, $C2$, $C3$, each extreme point $C0$, $C1$, $C2$, $C3$ being itself defined in a reference frame (U, V) attached to the airfoil profile and defined by an abscissa axis U formed by the direction of the chord c and by an ordinate axis V perpendicular to the abscissa axis U, one unit of the abscissa and ordinate axes U, V being equal to the chord c, the chord c of each airfoil profile thus being considered to be of unit size in the reference frame (U, V), a first extreme point $C0$ of coordinates (1, 0) being situated at the leading edge, a second extreme point $C2$ of coordinates (0, 0) being situated at the trailing edge, and third and fourth extreme points $C1$, $C3$ forming the maximum thickness t of the airfoil profile.

The transverse direction Y is preferably perpendicular to the spanwise longitudinal direction X. A direction in elevation Z is defined perpendicularly to the longitudinal and transverse directions X and Y in order to form a right-handed rectangular reference frame (X, Y, Z). The transverse plane $P_{YZ}$ perpendicular to the longitudinal direction X is thus defined by the transverse direction Y and by the direction in elevation Z.

The thick airfoil shape of the invention is remarkable in that tangents to each airfoil profile at the third and fourth extreme points $C1$, $C3$ are defined parallel to the abscissa axis U and the coordinates ($uC_i$, $vC_i$) of the third and fourth extreme points $C1$, $C3$ in the reference frame U, V are defined as a function of the relative thickness t/c and are situated within ranges bounded by low values B and high values H given in the following table:

| t/c | | $uC_1$ | $vC_1$ | $uC_3$ | $vC_3$ |
|---|---|---|---|---|---|
| 20% | B | 0.55 | 0.12 | 0.55 | −0.08 |
| | H | 0.70 | 0.16 | 0.75 | −0.04 |
| 25% | B | 0.63 | 0.14 | 0.55 | −0.11 |
| | H | 0.73 | 0.19 | 0.75 | −0.06 |
| 30% | B | 0.65 | 0.18 | 0.62 | −0.12 |
| | H | 0.75 | 0.22 | 0.72 | −0.08 |
| 35% | B | 0.65 | 0.20 | 0.62 | −0.15 |
| | H | 0.75 | 0.24 | 0.73 | −0.11 |
| 40% | B | 0.48 | 0.23 | 0.45 | −0.17 |
| | H | 0.63 | 0.28 | 0.65 | −0.12 |
| 50% | B | 0.35 | 0.28 | 0.37 | −0.22 |
| | H | 0.49 | 0.37 | 0.57 | −0.13 |
| 60% | B | 0.25 | 0.34 | 0.30 | −0.26 |
| | H | 0.42 | 0.45 | 0.50 | −0.15 |
| 70% | B | 0.20 | 0.44 | 0.20 | −0.26 |
| | H | 0.40 | 0.56 | 0.30 | −0.14 |
| 80% | B | 0.36 | 0.47 | 0.19 | −0.33 |
| | H | 0.52 | 0.57 | 0.31 | −0.23 |
| 90% | B | 0.37 | 0.47 | 0.20 | −0.43 |
| | H | 0.52 | 0.59 | 0.30 | −0.31 |
| 100% | B | 0.40 | 0.45 | 0.22 | −0.55 |
| | H | 0.50 | 0.60 | 0.32 | −0.40 |

This thick airfoil shape is for arranging on a rotor of an aircraft, and in particular for forming a blade neck connecting the blade root of the blade to the streamlined portion of the blade, and more precisely to the start radius of said streamlined portion, or else a blade cuff serving to fair a structural junction device connecting a blade to the hub of the rotor. The rotor may be a lift rotor, an anti-torque tail rotor, or indeed a propulsive propeller of an aircraft.

A rotor of an aircraft comprises a rotary hub and at least two blades driven in rotation by the rotary hub, each blade being connected to the hub by a structural junction device. The blade comprises a blade root, a streamlined portion, and a blade neck, the streamlined portion representing a portion of greater or lesser length of the blade that is preferably formed by thin airfoil profiles. This streamlined portion provides the major part of the aerodynamic performance of the blade, and in particular of its lift.

These ranges bounded by the coordinates ($uC_i$, $vC_i$) of the third and fourth extreme points $C1$, $C3$ require the abscissa coordinates of these third and fourth extreme points $C1$, $C3$ to be situated in a first range [0.15c, 0.85c] in order advantageously to avoid large amounts of distortion in each airfoil profile of the thick airfoil shape. Specifically, this prohibits the third and fourth extreme points $C1$, $C3$ being situated in zones close to the leading edge and to the trailing edge, i.e. covering 15% of the chord c, as measured going from the leading edge, which corresponds to the first extreme point $C0$, and from the trailing edge, which corresponds to the second extreme point $C2$, which means that the maximum thickness t of each airfoil profile is situated in a central zone of each airfoil profile covering the first range.

Consequently, the central zone of each airfoil profile may contain a rectangular section of significant height and width, or even a square section, e.g. making it possible to receive a structural junction device when the thick airfoil shape constitutes a blade cuff. This central zone of each airfoil profile also serves, when the thick airfoil shape forms a blade neck, to ensure that the blade neck presents significant mechanical strength and stiffness.

Furthermore, these ranges bounded by the coordinates ($uC_i$, $vC_i$) of the third and fourth extreme points $C1$, $C3$ ensure that the ordinate coordinate of the third extreme point $C1$, situated on the suction side profile lies in a second range [0.02(t/c), 0.98(t/c)] so as firstly to impose camber on the airfoil profile and secondly so as to limit that camber. As a result, the airfoil profile is cambered, while avoiding obtaining a airfoil profile with excessive camber. Furthermore, the ordinate coordinate of the fourth extreme point $C3$ is then such that the distance between the third and fourth extreme points $C1$ and $C3$ measured parallel to the ordinate axis V is equal to the maximum thickness t of the airfoil profile.

The thick airfoil shape as defined in this way serves advantageously during forward flight of the aircraft to reduce separations of the air stream both for an advancing blade and for a retreating blade. Specifically, such a thick airfoil shape serves in particular to improve the penetration into the air stream of the thick airfoil shape for a retreating blade, the air stream then flowing from the trailing edge towards the leading edge, but without degrading such penetration into the air stream for an advancing blade, the lift-to-drag ratio of the thick airfoil shape being maximized under such circumstances. Specifically, this thick airfoil shape is adapted to flow conditions that are very different, corresponding to the different azimuth positions of the blades during a complete revolution of the rotor. In particular, there is a significant improvement in the aerodynamic behavior of the thick airfoil shape while it is in retreating during its rotation.

As a result, this thick airfoil shape serves to reduce the aerodynamic drag that is generated and the wake that is produced, and also serves to limit both the amplitudes of the unsteadinesses contained in the wake and also the frequency signature of the wake.

The blade necks of the blades of the rotor in an aircraft that does not make use of such a thick airfoil shape are responsible for about 7% to 10% of the total aerodynamic drag of a conventional aircraft in forward flight, and the cuffs are responsible for 10% to 15% of the total aerodynamic drag. Consequently, reducing the aerodynamic drag generated by such a thick airfoil shape of the invention, when applied to the blade neck and/or to the cuff of each blade of the rotor, thus serves to obtain a reduction of about 17% to 25% in the total aerodynamic drag of an aircraft and thus to provide a significant gain in the performance of the aircraft in forward flight.

Furthermore, this reduction in aerodynamic drag of the blade necks and of the blade cuffs also has an effect during hovering flight of the rotary wing aircraft, thereby making it possible to reduce the rotor torque while hovering.

Each airfoil profile of the thick shape of the invention serves advantageously to limit the appearance of aerodynamic disturbances, in particular such as aerodynamic drag and a wake, both when an air stream sweeps the airfoil profile from the leading edge towards the trailing edge and also when an air stream sweeper from the trailing edge towards the leading edge. Specifically, the lift-to-drag ratio of each airfoil profile is maximized for an air stream sweeping it from the leading edge towards the trailing edge, e.g. with a positive angle of incidence lying in the range 5 degrees to 15 degrees. Likewise, the aerodynamic drag is minimized for an air stream sweeping it from the trailing edge towards the leading edge, e.g. with a positive angle of incidence lying in the range 165 degrees to 175 degrees.

The airfoil profiles of this thick airfoil shape also serve advantageously to increase the aerodynamic lift generated in hovering flight and in forward flight of the aircraft compared with the airfoil profiles that are conventionally used on blade necks and blade cuffs. This increase in lift contributes to increasing the available margin for the aerodynamic performance of the rotor of the aircraft and to increase the downward air stream driven by this zone of each blade close to the hub. This increase in the air stream driven downwards makes it possible under certain conditions of flight, e.g. at low speeds of advance or when hovering, to achieve large improvements in performance, while reducing any risk of air recirculation that might lead to an engine of the aircraft ingesting exhaust gas that is has itself produced.

In addition, the curves forming each airfoil profile need to be convex without any reversals of pitch. Specifically, the presence of a point of inflection or of a cusp or indeed of a pitch reversal on an airfoil profile would have the consequence of a greater or lesser degradation of the aerodynamic performance of that airfoil profile in a manner that is incompatible with the looked-for objectives.

For each airfoil profile, optimized values for the coordinates (uCi, vCi) of the third and fourth extreme points C1, C3 are defined as a function of the relative thickness t/c of the airfoil profile in the following table:

| t/c | uC$_1$ | vC$_1$ | uC$_3$ | vC$_3$ |
| --- | --- | --- | --- | --- |
| 20% | 0.65 | 0.148 | 0.65 | −0.052 |
| 25% | 0.71 | 0.17 | 0.66 | −0.08 |
| 30% | 0.72 | 0.20 | 0.66 | −0.10 |
| 35% | 0.69 | 0.22 | 0.68 | −0.13 |
| 40% | 0.55 | 0.26 | 0.51 | −0.14 |
| 50% | 0.42 | 0.325 | 0.42 | −0.175 |
| 60% | 0.32 | 0.39 | 0.35 | −0.21 |
| 70% | 0.31 | 0.50 | 0.23 | −0.20 |
| 80% | 0.42 | 0.54 | 0.24 | −0.28 |
| 90% | 0.44 | 0.555 | 0.26 | −0.345 |
| 100% | 0.445 | 0.565 | 0.275 | −0.435 |

Furthermore, the tangents of each airfoil profile of the thick airfoil shape at the first and second extreme points C0, C2, i.e. at the leading edge and at the trailing edge of each airfoil profile, may be imposed and defined to be parallel to the ordinate axis V.

Furthermore, intermediate thick airfoil profiles of intermediate relative thickness t/c lying between lower and upper relative thicknesses $(t/c)_{min}$ and $(t/c)_{max}$ as provided in one of these tables can be obtained by interpolation from two thick airfoil profiles corresponding to the lower and upper relative thicknesses $(t/c)_{min}$ and $(t/c)_{max}$. These thick airfoil profiles are then not properly speaking optimized since they are not the result of an optimization process, but rather the result of interpolation between two thick airfoil profiles that are optimized.

Nevertheless, such intermediate thick airfoil profiles serve advantageously to come close to or indeed to achieve the looked-for objectives, but without having to implement an optimization process.

The coordinates (u, v) of each point forming an intermediate thick airfoil profile are defined by interpolation, such as a polynomial interpolation, e.g. interpolation that is linear, quadratic, or of some other order, from a first airfoil profile having a lower relative thickness $(t/c)_{min}$ and a second airfoil profile having an upper relative thickness $(t/c)_{max}$, e.g. constructed from one of the above-mentioned tables.

The ordinate coordinate v of each point of the intermediate thick airfoil profile of relative thickness t/c is determined for example by a linear interpolation using the following relationship:

$$v = \frac{\left(\frac{t}{c}\right) - \left(\frac{t}{c}\right)_{min}}{\left(\frac{t}{c}\right)_{max} - \left(\frac{t}{c}\right)_{min}} v_{max} + \left(1 - \frac{\left(\frac{t}{c}\right) - \left(\frac{t}{c}\right)_{min}}{\left(\frac{t}{c}\right)_{max} - \left(\frac{t}{c}\right)_{min}}\right) v_{min}$$

$v_{min}$ being a first ordinate coordinate for the point of the first airfoil profile having the same abscissa coordinate u as the point of coordinates (u, v) of the intermediate thick airfoil profile, and $v_{max}$ being a second ordinate coordinate for the point of the second airfoil profile having the same abscissa coordinate u as the point of coordinates (u, v) of the intermediate thick airfoil profile.

The present invention also provides a blade having a thick airfoil shape as described above, a streamlined portion, and a blade root, the thick airfoil shape constituting a blade neck connecting the blade root to the streamlined portion.

The present invention also provides an aircraft rotor comprising a hub, and at least two blades, each having a streamlined portion and a blade root. Each blade includes a thick airfoil shape as described above constituting a blade neck and connecting the blade root to the streamlined portion so as to reduce the aerodynamic drag and the production of wake by the rotor and thus limit the amplitudes of unsteadinesses contained in the wake and so as to reduce a frequency signature of the wake while the rotor is rotating and the aircraft is advancing. The rotor may be a lift rotor, an anti-torque tail rotor, or indeed a propulsive propeller of an aircraft.

The present invention also provides an aircraft rotor comprising a hub, at least two blades, and structural junction devices each connecting a respective blade to the hub together with cuffs serving to fair each structural junction device. Each cuff is advantageously formed by a thick airfoil shape as described above so as to reduce aerodynamic drag and the production of wake from the rotor, and also so as to limit the amplitudes of unsteadinesses contained in the wake and so as to reduce a frequency signature of the wake during rotation of the rotor while the aircraft is advancing. The rotor may be a lift rotor, an anti-torque tail rotor, or indeed a propulsive propeller of an aircraft.

The present invention also provides an aircraft rotor comprising a hub, at least two blades, structural junction devices, and cuffs. Each cuff and each blade neck is advantageously formed by a thick airfoil shape as described above so as to minimize in particular the aerodynamic drag and the production of wake from the rotor. The rotor may be a lift rotor, an anti-torque tail rotor, or indeed a propulsive propeller of an aircraft.

Finally, the invention provides a rotary wing aircraft comprising a fuselage, a tail boom, optionally at least one horizontal and/or vertical stabilizer, and at least one rotor as described above. Each rotor is thus advantageously configured so that firstly it reduces the production of wake from the rotor together with the unsteadinesses that characterize such a wake, and secondly it limits frequency excitation and the appearance of vibration in elements of the aircraft that are situated behind the rotor, and in particular the tail boom and each stabilizer, if any.

The present invention also provides a method of obtaining a thick airfoil shape as described above, the thick airfoil shape being for arranging between a rotary hub of a rotor of an aircraft and a streamlined portion of a blade of the rotor, the thick airfoil shape extending firstly spanwise in a longitudinal direction X from a first end zone towards a second end zone, and secondly in a transverse direction Y from a leading edge to a trailing edge, the thick airfoil shape being made up of a succession of thick airfoil profiles situated in planes parallel to a transverse plane $P_{YZ}$ perpendicular to the spanwise longitudinal direction X, each thick airfoil profile having a suction side profile and a pressure side profile, each thick airfoil profile being defined by a chord c between the leading edge and the trailing edge, by a maximum thickness t equal to a maximum distance between the suction side profile and the pressure side profile measured perpendicularly to the chord c, and by a relative thickness t/c equal to the ratio of the maximum thickness t divided by the chord c, the relative thickness t/c being greater than or equal to 20% for each thick airfoil profile.

This method of obtaining a thick airfoil shape includes the following steps for defining each airfoil profile making up the thick airfoil shape:

a first creation step for creating m+1 characteristic points $A0, \ldots, Ai, \ldots, Am$ belonging to the airfoil profile, i being a positive integer lying in the range 0 to m, each characteristic point Ai being defined in a reference frame (U, V) attached to the airfoil profile and defined by an abscissa axis U formed by the direction of the chord c and by an ordinate axis V perpendicular to the abscissa axis U, one unit of the abscissa and ordinate axes U, V being equal to the chord c, the chord c of each airfoil profile being considered to be of unit length;

a second creation step for creating control points $Bi.1, \ldots, Bi.j, \ldots, Bi.n$, n control points $Bi.1, \ldots, Bi.j, \ldots, Bi.n$ being situated respectively between two consecutive characteristic points Ai, Ai+1 and being construction points for constructing the airfoil profile between the two consecutive characteristic points Ai, Ai+1, n being a positive integer greater than or equal to 2, j being a positive integer lying in the range 1 to n, (i+1) being replaced by the value zero "0" when i is equal to m; and a determination step for determining the airfoil profile, (m+1) curves respectively connecting together two consecutive characteristic points Ai, Ai+1 and being constructed respectively from the control points $Bi.1, \ldots, Bi.j, \ldots, Bi.n$, the (m+1) curves being connected in pairs to form the thick airfoil profile, the airfoil profile passing through extreme points C0, C1, C2, C3, a first extreme point C0 of coordinates (1, 0) being situated at the leading edge of the airfoil profile, a second extreme point C2 of coordinates (0, 0) being situated at the trailing edge of the airfoil profile, and third and fourth extreme points C1, C3 forming the maximum thickness t of the airfoil profile, the tangents of each airfoil profile at the third and fourth extreme points C1, C3 being defined parallel to the abscissa axis U, and the coordinates (uCi, vCi) of the third and fourth extreme points C1, C3 in the reference frame (U, V) being defined as a function of the relative thickness t/c and being situated within ranges bounded by low values B and high values H given in the following table:

| t/c | | $uC_1$ | $vC_1$ | $uC_3$ | $vC_3$ |
|---|---|---|---|---|---|
| 20% | B | 0.55 | 0.12 | 0.55 | −0.08 |
| | H | 0.70 | 0.16 | 0.75 | −0.04 |
| 25% | B | 0.63 | 0.14 | 0.55 | −0.11 |
| | H | 0.73 | 0.19 | 0.75 | −0.06 |
| 30% | B | 0.65 | 0.18 | 0.62 | −0.12 |
| | H | 0.75 | 0.22 | 0.72 | −0.08 |
| 35% | B | 0.65 | 0.20 | 0.62 | −0.15 |
| | H | 0.75 | 0.24 | 0.73 | −0.11 |
| 40% | B | 0.48 | 0.23 | 0.45 | −0.17 |
| | H | 0.63 | 0.28 | 0.65 | −0.12 |
| 50% | B | 0.35 | 0.28 | 0.37 | −0.22 |
| | H | 0.49 | 0.37 | 0.57 | −0.13 |
| 60% | B | 0.25 | 0.34 | 0.30 | −0.26 |
| | H | 0.42 | 0.45 | 0.50 | −0.15 |
| 70% | B | 0.20 | 0.44 | 0.20 | −0.26 |
| | H | 0.40 | 0.56 | 0.30 | −0.14 |
| 80% | B | 0.36 | 0.47 | 0.19 | −0.33 |
| | H | 0.52 | 0.57 | 0.31 | −0.23 |
| 90% | B | 0.37 | 0.47 | 0.20 | −0.43 |
| | H | 0.52 | 0.59 | 0.30 | −0.31 |
| 100% | B | 0.40 | 0.45 | 0.22 | −0.55 |
| | H | 0.50 | 0.60 | 0.32 | −0.40 |

Each thick airfoil profile as obtained in this way can be used to define and fabricate a thick airfoil shape for arranging on a rotor of an aircraft. The rotor may be a lift rotor, an anti-torque tail rotor, or indeed a propulsive propeller of an aircraft. The thick airfoil shape is then formed by a succession of thick airfoil profiles situated in planes parallel to the transverse plane $P_{YZ}$. This thick airfoil shape is intended in particular to form a blade neck connecting the blade root of the blade to the streamlined portion of the blade, or indeed a blade cuff serving to fair a structural junction device connecting a blade to the rotor hub.

A thick airfoil profile is then determined by means of (m+1) curves that are connected together in pairs respectively via a characteristic point Ai common to each of the two curves. By way of example, one such curve is a polynomial of degree (n+1), a spline defined piecewise by polynomials, or indeed a Bezier curve of order (n+1), where n is the number of control points Bi.j that are necessary and sufficient for constructing the curve.

The minimum number of control points Bi.j enabling each curve to be constructed is equal to two. This minimum number of control points Bi.j serves to guarantee that the curve connecting together two consecutive characteristic points Ai, Ai+1 does not have any points of inflection. When the number n of control points Bi.j is equal to two, each curve connecting two consecutive characteristic points Ai, Ai+1 is constituted by a polynomial of degree 3 or by a Bezier curve of order 3, for example. Curves of higher order can be used providing those curves do not include oscillations that could generate aerodynamic penalties on the thick airfoil shape formed by the airfoil profile.

Furthermore, the airfoil profile passes through predetermined extreme points C0, C1, C2, C3 serving to characterize the airfoil profile. The abscissa coordinates of the third and fourth extreme points C1, C3 are advantageously situated in the first range [0.15c, 0.85c] and the ordinate coordinate of the third extreme point C1 lies in the second range [0.02(t/c), 0.98(t/c)].

Each airfoil profile as determined in this way by the method of the invention serves advantageously to define and construct the above-described shape, serving in particular to improve the penetration into the air stream of the thick airfoil shape for a retreating blade, the air stream then flowing from the trailing edge towards the leading edge, but without degrading such penetration into the air stream for an advancing blade.

Furthermore, for each airfoil profile, the tangents of two curves connected to each other at a common characteristic point Ai are preferably identical at that common characteristic point Ai so as to avoid any tangent discontinuity in the airfoil profile at that common characteristic point Ai, or indeed so as to avoid the appearance of a point of inflection or a cusp in the airfoil profile.

Furthermore, the tangents of the airfoil profile at the first and second extreme points C0, C2, i.e. the leading edge and the trailing edge of the airfoil profile, may be defined as being parallel to the ordinate axis V.

In addition, optimized values for the coordinates (uCi, vCi) of the third and fourth extreme points C1, C3 are defined as a function of the relative thickness t/c of the airfoil profile in the following table:

| t/c | $uC_1$ | $vC_1$ | $uC_3$ | $vC_3$ |
|---|---|---|---|---|
| 20% | 0.65 | 0.148 | 0.65 | −0.052 |
| 25% | 0.71 | 0.17 | 0.66 | −0.08 |
| 30% | 0.72 | 0.20 | 0.66 | −0.10 |
| 35% | 0.69 | 0.22 | 0.68 | −0.13 |
| 40% | 0.55 | 0.26 | 0.51 | −0.14 |
| 50% | 0.42 | 0.325 | 0.42 | −0.175 |
| 60% | 0.32 | 0.39 | 0.35 | −0.21 |
| 70% | 0.31 | 0.50 | 0.23 | −0.20 |
| 80% | 0.42 | 0.54 | 0.24 | −0.28 |
| 90% | 0.44 | 0.555 | 0.26 | −0.345 |
| 100% | 0.445 | 0.565 | 0.275 | −0.435 |

These three main steps may be executed once more and in iterative manner until converging on an airfoil profile that satisfies the looked-for objectives for an air stream sweeping this airfoil profile, both from the leading edge towards the trailing edge and from the trailing edge towards the leading edge, i.e. in particular maximizing lift-to-drag ratio, generating minimized aerodynamic drag, and generating limited wake.

These steps may be performed by a calculation unit or a processor, e.g. by applying an algorithm for optimizing thick airfoil profiles.

The method of the invention may also include additional steps.

The method of the invention may include a simulation first additional step serving to validate each airfoil profile relative to the looked-for objective. By way of example, the digital simulation is performed using appropriate digital simulation software serving to simulate the aerodynamic behavior of each airfoil profile when it is swept by a first air stream from the leading edge towards the trailing edge, and by a second air stream from the trailing edge towards to the leading edge. Depending on the results of the simulation, the preceding steps may be performed once more, where necessary. This simulation first additional step also serves to verify the absence of points of inflection or of cusps or of reversals of pitch for each airfoil profile.

The method of the invention may include a definition second additional step for defining a thick airfoil shape by combining airfoil profiles defined during the steps of determining an airfoil profile. The thick airfoil shape is then formed by a succession of thick airfoil profiles situated in planes parallel to the transverse plane $P_{YZ}$. These thick airfoil profiles have chords c and maximum thicknesses t that may be different as well as relative thicknesses t/c that may be different. Preferably, the relative thickness t/c of each thick airfoil profile lies in the range 20% to 100%.

The method of the invention may also include an obtaining third additional step for actually obtaining the above-defined thick airfoil shape. During this third additional step, the thick airfoil profiles may for example be taken into account when making a mold for fabricating the thick airfoil shape or indeed while machining the thick airfoil shape.

In addition, the curves forming each airfoil profile need to be convex and without any reversal of pitch. Specifically, the presence of a point of inflection or of a cusp, and also in the presence of a reversal of pitch in one or more of these curves would have the consequence of degrading the aerodynamic performance of the airfoil profile to a greater or lesser extent that would be incompatible with the looked-for objectives.

Under such circumstances, the control points Bi.j need to be situated in a zone representing a third range that is bounded relative to the positions of two consecutive characteristic points Ai, Ai+1 so as to avoid not only the presence of points of inflection or of cusp or indeed of a reversal of pitch, but also curvatures that are excessive for each curve, e.g. formed using a Bezier curve. The control points Bi.j of the curves can thus be defined by a third range covering exactly the zone covered by the characteristic points Ai, Ai+1 respectively on the abscissa and ordinate axes U and V. This defines a third range [0%, 100%] of the zone covered by two consecutive characteristic points Ai, Ai+1.

Nevertheless, in order to enlarge the field of search for control points Bi.j, while limiting any risk of generating a point of inflection or a cusp or indeed a reversal of pitch, the third range is preferably enlarged to cover [−25%, 125%] of the zone covered by the two consecutive characteristic points Ai, Ai+1. The control points Bi.j can thus be situated on a zone along the abscissa and ordinate axes U and V up to 25% of the distance between the two consecutive characteristic points Ai, Ai+1 parallel to those abscissa and ordinate axes U and V and beyond each consecutive characteristic point Ai, Ai+1.

It should be recalled that if each curve is formed by a Bezier curve, then the tangent to one Bezier curve at a first characteristic point Ai is defined by a line connecting the first characteristic point Ai to the control point Bi.1 and that the tangent to said Bezier curve at a second characteristic point Ai+1 is defined by a second line connecting the second characteristic point Ai+1 to the control point Bi.n. As a result, the control points Bi.1, Bi.n serve in particular to accentuate the magnitude and the effect of a tangent at a characteristic point Ai. By way of example, the control points Bi.1, Bi.n serve to accentuate the flat zone at the third and fourth extreme points C1, C3 and to define leading and trailing edges that are more or less rounded.

In an implementation of the method of the invention, four characteristic points A0, A1, A2, A3 are created during the first creation first step, these characteristic points A0, A1, A2, A3 being the four predetermined extreme points C0, C1, C2, C3 as mentioned above, forming part of the thick airfoil profile forming the thick airfoil shape.

A thick airfoil profile is then determined from four curves, e.g. four Bezier curves of order (n+1) connected together in pairs respectively at a characteristic point Ai common to two Bezier curves. For example, the four Bezier curves are of order 3, so n is equal to 2. Two control points Bi.1, Bi.2 are then necessary and sufficient for constructing each Bezier curve having as its ends the characteristic points Ai, Ai+1.

It should be recalled that the points P(x) forming such a Bezier curve of order 3 are defined by the following relationship:

$$P(x)=(1-3)^3 \cdot A_i + 3 \cdot (1-x)^2 \cdot x \cdot B_{i \cdot 1} + 3 \cdot (1-x) \cdot x^2 \cdot B_{i \cdot 2} + x^3 \cdot A_{i+1}$$

for x in the range 0 to 1.

Under such circumstances, the tangents to the airfoil profile at the third and fourth characteristic points A1, A3, i.e. the points corresponding to the maximum thickness t of the airfoil profile, are parallel to the abscissa axis U, and the ordinate coordinates of the two control points B0.2, B1.1 are equal to the ordinate coordinate of the third characteristic point A1, and the ordinate coordinate of the two control points B2.2, B3.1 are equal to the ordinate coordinate of the fourth characteristic point A3.

Furthermore, the tangents to the airfoil profile at the first and second characteristic points A0, A2, namely the leading edge and the trailing edge of the airfoil profile, may for example be defined as being parallel to the ordinate axis V. Consequently, the abscissa coordinates of the two control points B3.2, B0.1 are equal to the abscissa coordinate of the first characteristic point A0, and the abscissa coordinates of the two control points B1.2, B2.1 are equal to the abscissa coordinate of the second characteristic point A2.

Furthermore, for each relative thickness t/c of the airfoil profile in the range 20% to 100%, and when using Bezier curves of order 3, the optimized ranges bounded by low and high values B and H are defined for the control points B0.1, B0.2, B1.1, B1.2, B2.1, B2.2, B3.1, B3.2 serving to define airfoil profiles satisfying the above-mentioned looked-for objectives. For the control points Bi.1, ..., Bi.j, ..., Bi.3, the ranges correspond respectively to the coefficients CuBi.j, CvBi.j of these control points Bi.j. The coefficients CuBi.j, CvBi.j define the positions of the control points Bi.j relative to two consecutive characteristic points Ai, Ai+1, with each coefficient CuBi.j, CvBi.j being multiplied by the distance between the two consecutive characteristic points Ai, Ai+1 in parallel respectively with the abscissa and ordinate axes U and V in order to define the position of the control point Bi.j relative to the characteristic point Ai in parallel respectively with the abscissa and ordinate axes U and V and going towards the characteristic point Ai+1.

The low and high values B and H of these ranges optimized for the control points Bi.j are listed respectively in the following table as a function of the relative thickness t/c of the airfoil profile:

| t/c | | $CvB_{0.1}$ | $CuB_{0.2}$ | $CuB_{1.1}$ | $CvB_{1.2}$ | $CvB_{2.1}$ | $CuB_{2.2}$ | $CvB_{3.1}$ | $CuB_{3.2}$ |
|---|---|---|---|---|---|---|---|---|---|
| 20% | B | 0.80 | 0.10 | 0.30 | −0.10 | 0.50 | 0 | 0.65 | 0 |
|  | H | 0.90 | 0.25 | 0.40 | 0.10 | 0.90 | 0.05 | 0.85 | 0.15 |
| 25% | B | 0.80 | 0.30 | 0.80 | 0.30 | 0.40 | 0.20 | 0.80 | 0.50 |
|  | H | 0.90 | 0.50 | 0.85 | 0.60 | 0.80 | 0.30 | 0.90 | 0.80 |
| 30% | B | 0.35 | 0.10 | 0.40 | 0.05 | 0.35 | 0.20 | 0.80 | 0.50 |
|  | H | 0.45 | 0.20 | 0.50 | 0.25 | 0.70 | 0.30 | 0.90 | 0.65 |
| 35% | B | 0.74 | 0.34 | 0.60 | 0.22 | 0.25 | 0.15 | 0.80 | 0.50 |
|  | H | 0.88 | 0.70 | 0.70 | 0.32 | 0.50 | 0.30 | 0.90 | 0.65 |
| 40% | B | 0.85 | 0.35 | 0.65 | 0.12 | 0.77 | 0.45 | 0.70 | 0.37 |
|  | H | 1.10 | 0.52 | 0.86 | 0.24 | 1.10 | 0.65 | 0.95 | 0.65 |
| 50% | B | 0.70 | 0.15 | 0.67 | 0.05 | 0.81 | 0.39 | 0.77 | 0.41 |
|  | H | 0.90 | 0.30 | 0.86 | 0.14 | 1.00 | 0.63 | 0.98 | 0.61 |
| 60% | B | 0.60 | 0.10 | 0.70 | 0.05 | 0.70 | 0.25 | 0.15 | 0.00 |
|  | H | 0.80 | 0.20 | 0.85 | 0.12 | 0.80 | 0.35 | 0.35 | 0.15 |
| 70% | B | 0.75 | 0.08 | 0.65 | −0.03 | 0.70 | 0.25 | 0.22 | −.05 |
|  | H | 0.90 | 0.16 | 0.90 | 0.05 | 0.80 | 0.35 | 0.45 | 0.15 |
| 80% | B | 0.85 | 0.20 | 0.65 | −0.04 | 0.60 | 0.30 | 0.80 | 0.57 |
|  | H | 1.05 | 0.35 | 0.92 | 0.05 | 0.90 | 0.50 | 0.90 | 0.85 |
| 90% | B | 0.80 | 0.15 | 0.71 | −0.03 | 0.65 | 0.43 | 0.79 | 0.57 |
|  | H | 0.98 | 0.28 | 0.93 | 0.15 | 0.93 | 0.60 | 0.94 | 0.81 |
| 100% | B | 0.75 | 0.10 | 0.75 | 0.00 | 0.65 | 0.50 | 0.77 | 0.60 |
|  | H | 0.95 | 0.25 | 0.95 | 0.25 | 1.00 | 0.70 | 0.97 | 0.80 |

Optimized values for the coefficients CuBi.j, CvBi.j of the control points B0.1, B0.2, B1.1, B1.2, B2.1, B2.2, B3.1, B3.2 are also defined as a function of the relative thickness t/c and they are listed in the following table:

| t/c | $CvB_{0.1}$ | $CuB_{0.2}$ | $CuB_{1.1}$ | $CvB_{1.2}$ | $CuB_{2.1}$ | $CuB_{2.2}$ | $CvB_{3.1}$ | $CuB_{3.2}$ |
|---|---|---|---|---|---|---|---|---|
| 20% | 0.85 | 0.22 | 0.37 | 0 | 0.60 | 0 | 0.70 | 0.10 |
| 25% | 0.85 | 0.42 | 0.81 | 0.42 | 0.50 | 0.22 | 0.85 | 0.69 |
| 30% | 0.38 | 0.13 | 0.44 | 0.16 | 0.49 | 0.24 | 0.85 | 0.65 |
| 35% | 0.81 | 0.44 | 0.66 | 0.24 | 0.34 | 0.22 | 0.85 | 0.65 |
| 40% | 0.97 | 0.45 | 0.76 | 0.20 | 0.91 | 0.54 | 0.85 | 0.54 |
| 50% | 0.83 | 0.21 | 0.76 | 0.07 | 0.93 | 0.56 | 0.88 | 0.54 |
| 60% | 0.75 | 0.15 | 0.80 | 0.05 | 0.75 | 0.29 | 0.25 | 0.10 |
| 70% | 0.85 | 0.11 | 0.71 | −0.01 | 0.75 | 0.29 | 0.40 | 0 |
| 80% | 0.95 | 0.27 | 0.75 | 0 | 0.73 | 0.45 | 0.85 | 0.69 |
| 90% | 0.86 | 0.21 | 0.81 | 0.09 | 0.78 | 0.53 | 0.88 | 0.69 |
| 100% | 0.82 | 0.16 | 0.83 | 0.16 | 0.78 | 0.57 | 0.89 | 0.69 |

In addition, intermediate thick airfoil profiles having intermediate relative thicknesses t/c lying between lower and upper relative thicknesses $(t/c)_{min}$ and $(t/c)_{max}$ as provided in one of these tables can be obtained by interpolation between two thick airfoil profiles corresponding to the lower and upper relative thicknesses $(t/c)_{min}$ and $(t/c)_{max}$. Under such circumstances, these thick airfoil profiles are not properly speaking optimized since they are not the result of an optimization process, but rather the result of interpolation between two thick airfoil profiles that have been optimized.

Nevertheless, such intermediate thick airfoil profiles serve advantageously to come close to or even to achieve the looked-for objectives, without it being necessary to run an optimization process.

The coordinates (u, v) of each point forming an intermediate thick airfoil profile are defined by interpolation, such as a polynomial interpolation, starting from a first airfoil profile of lower relative thickness $(t/c)_{min}$ and a second airfoil profile having an upper relative thickness $(t/c)_{max}$, e.g. constructed from one of these tables. The ordinate coordinate v of each point of the intermediate thick airfoil profile of relative thickness t/c is determined for example by a linear interpolation using the following relationship:

$$v = \frac{\left(\frac{t}{c}\right) - \left(\frac{t}{c}\right)_{min}}{\left(\frac{t}{c}\right)_{max} - \left(\frac{t}{c}\right)_{min}} v_{max} + \left(1 - \frac{\left(\frac{t}{c}\right) - \left(\frac{t}{c}\right)_{min}}{\left(\frac{t}{c}\right)_{max} - \left(\frac{t}{c}\right)_{min}}\right) v_{min}$$

$v_{min}$ being a first ordinate coordinate of the point of the first airfoil profile having the same abscissa coordinate u as the point of coordinates (u, v) of the intermediate thick airfoil profile, and $v_{max}$ being a second ordinate coordinate of the point of the second airfoil profile having the same abscissa coordinate u as the point of coordinates (u, v) of the intermediate thick airfoil profile.

BRIEF DESCRIPTION OF THE DRAWINGS

The invention and its advantages appear in greater detail from the context of the following description of embodiments given by way of illustration and with reference to the accompanying figures, in which.

Elements present in more than one of the figures are given the same references in each of them.

DETAILED DESCRIPTION OF THE INVENTION

Figure 1:
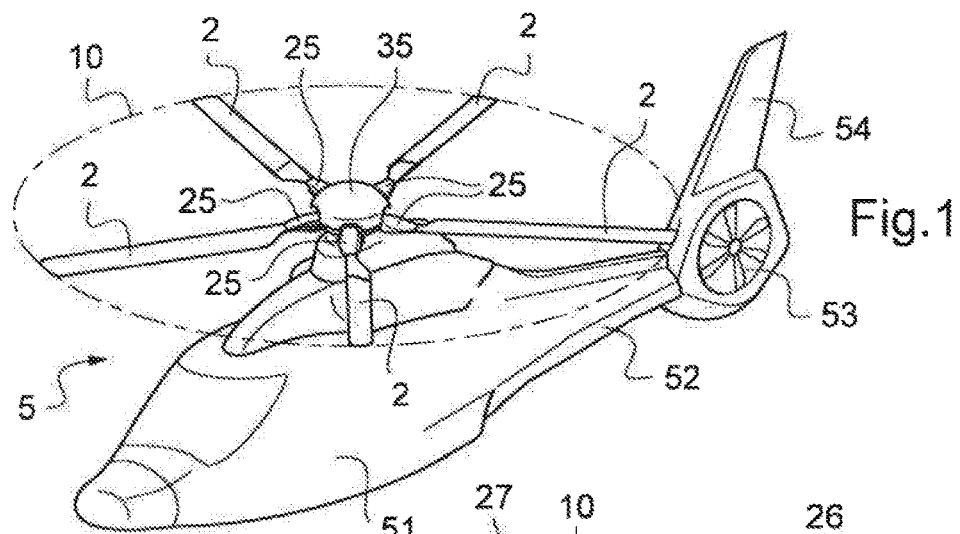
FIG. 1 shows an aircraft with a rotor.

FIG. 1 shows a rotary wing aircraft 5 having a fuselage 51, a main lift rotor 10, and a tail boom 52 supporting a yaw anti-torque tail rotor 53 and a vertical stabilizer 54. The main rotor 10 has a rotary hub 3, five blades 2, and five cuffs 25 together with a cap 35 and dampers 32 between the blades 2. The cap 35 provides protection and fairing for the head of the main rotor 10.

Figure 2:
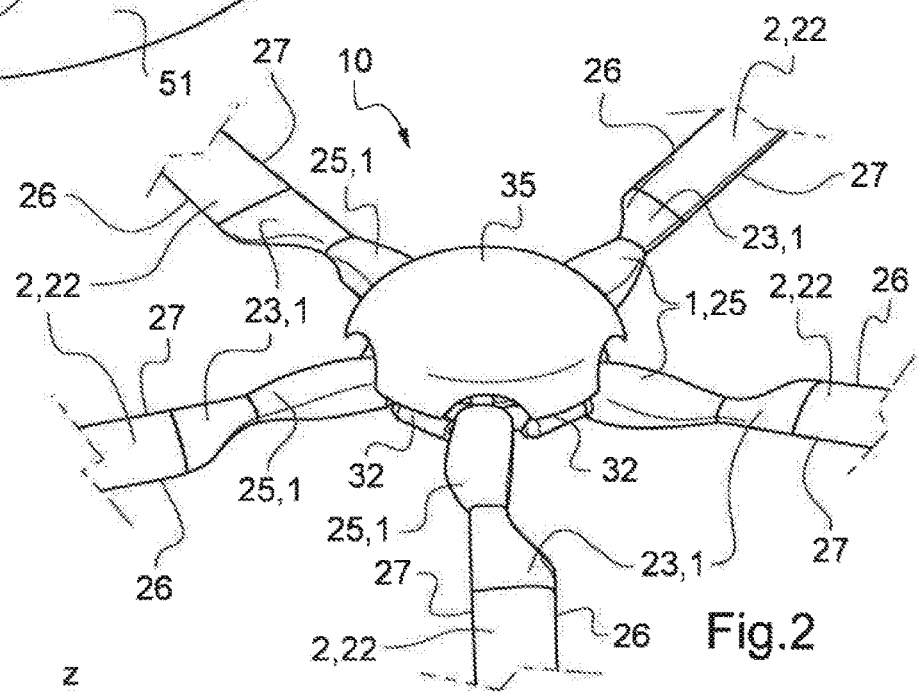
FIG. 2 is a fragmentary view of a rotor.

FIG. 2 shows the central portion of the main rotor 10, with the free end of each blade 2 being truncated. For each blade 2, the blade root 21, a blade neck 23, and part of the streamlined portion 22 of the blade 2 can be seen together with the cuff 25. The streamlined portion 22 of each blade 2 is made up of thin airfoil profiles, each having a tapering trailing edge 26 and serves to provide the essential part of the aerodynamic performance of the blade 2, and in particular the lift of the blade 2. The blade neck 23 connects the blade root 21 to the streamlined portion 22. The blade neck 23 of each blade 2 and each cuff 25 are formed by a thick airfoil shape 1.

Figure 3:
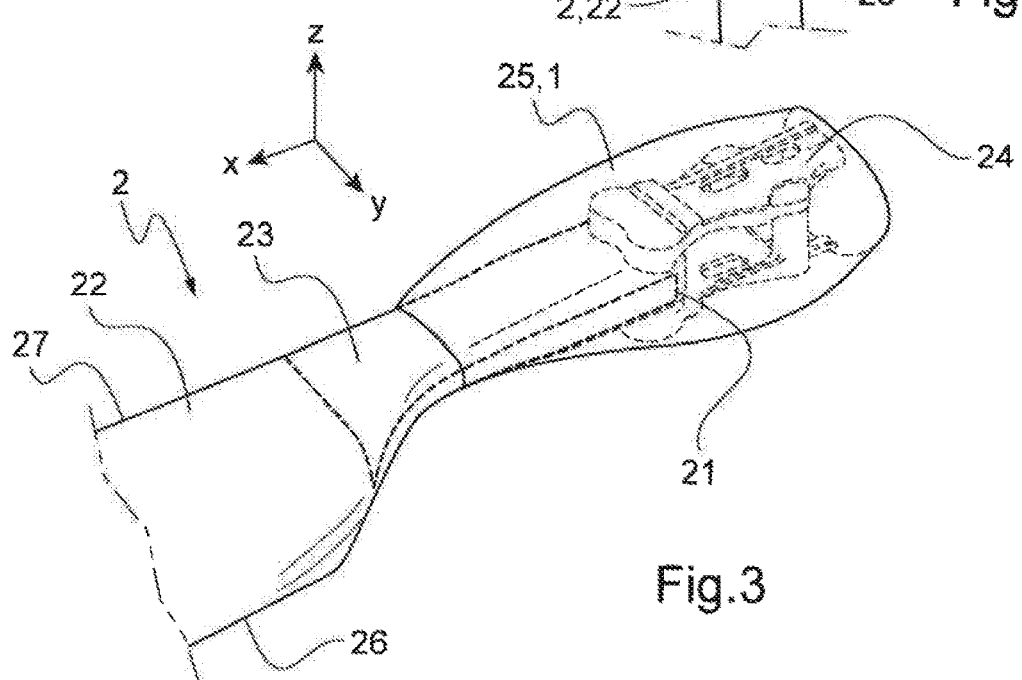
FIGS. 3 and 4 are two fragmentary perspective views of a cuff and a blade.
Figure 4:
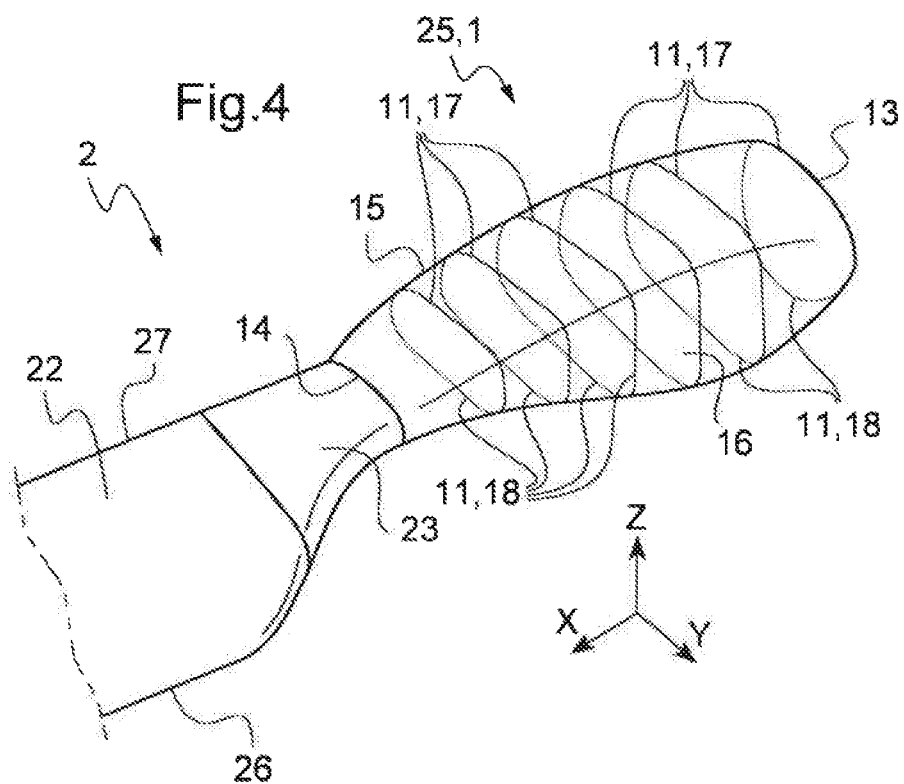

Each blade cuff 25 provides aerodynamic fairing of a structural junction device 24 connecting the blade 2, and more precisely the blade root 21, to the hub 3 of the main rotor 10, as shown in FIG. 3. Each blade cuff 25 is formed by a thick airfoil shape 1 shown in perspective in FIGS. 3 and 4 together with a portion of the blade 2. In FIGS. 3 and 4, the blade neck 23 is in accordance with the prior art.

Figure 5:
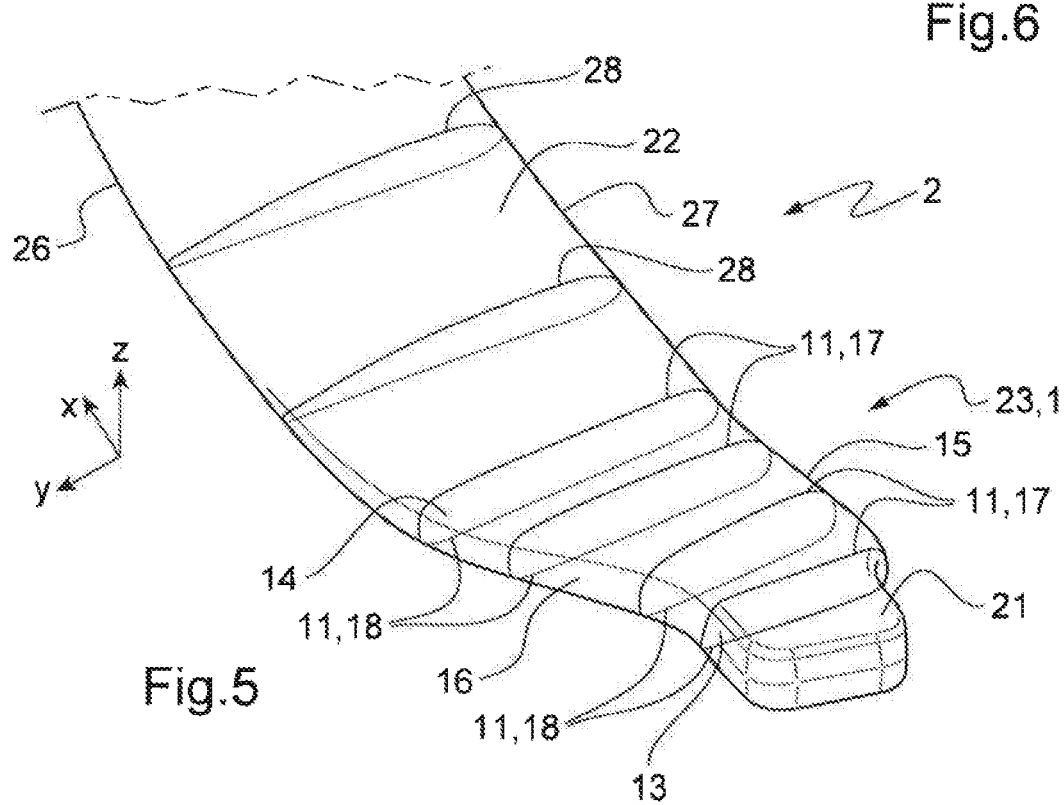
FIG. 5 is a fragmentary perspective view of a blade.
Figure 7:
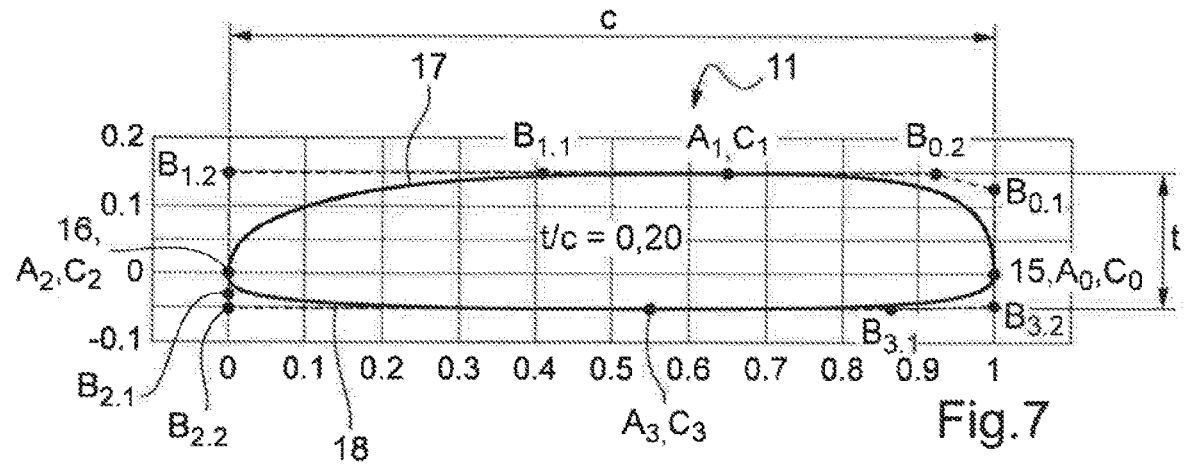
FIGS. 7 to 17 are airfoil profiles for thick airfoil shapes.
Figure 8:
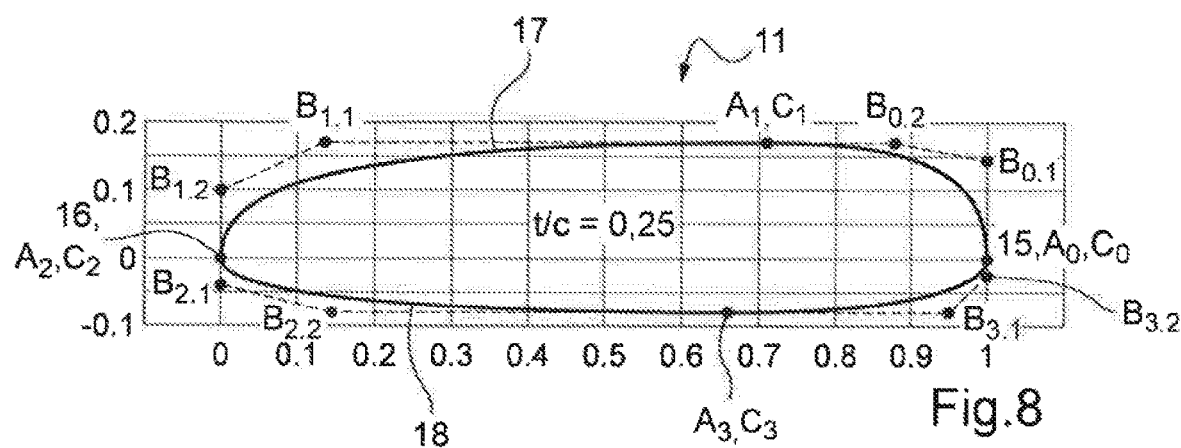
Figure 9:
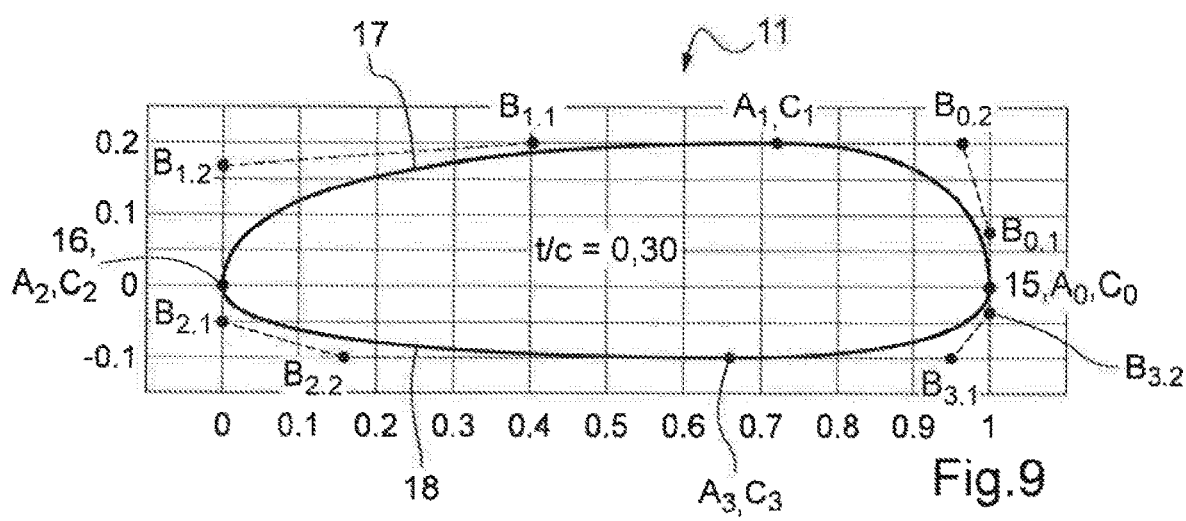
Figure 10:
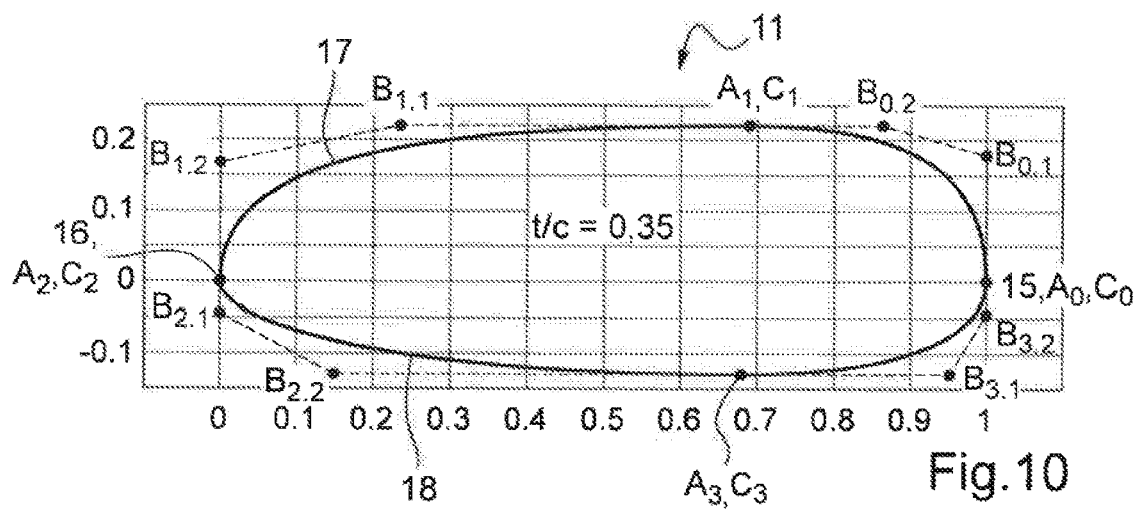
Figure 11:
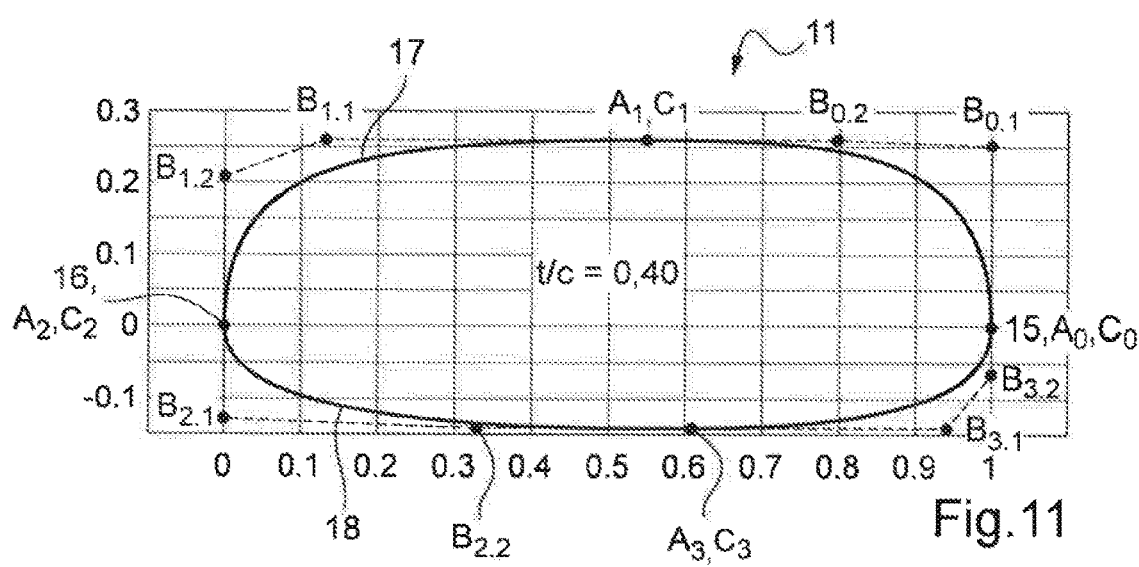
Figure 12:
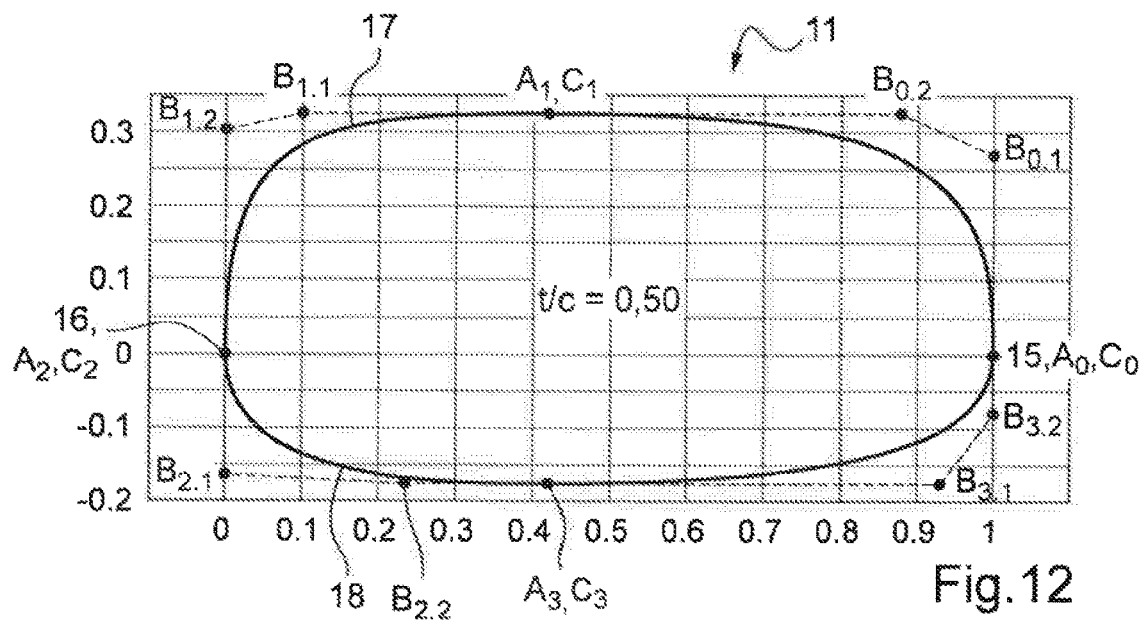
Figure 13:
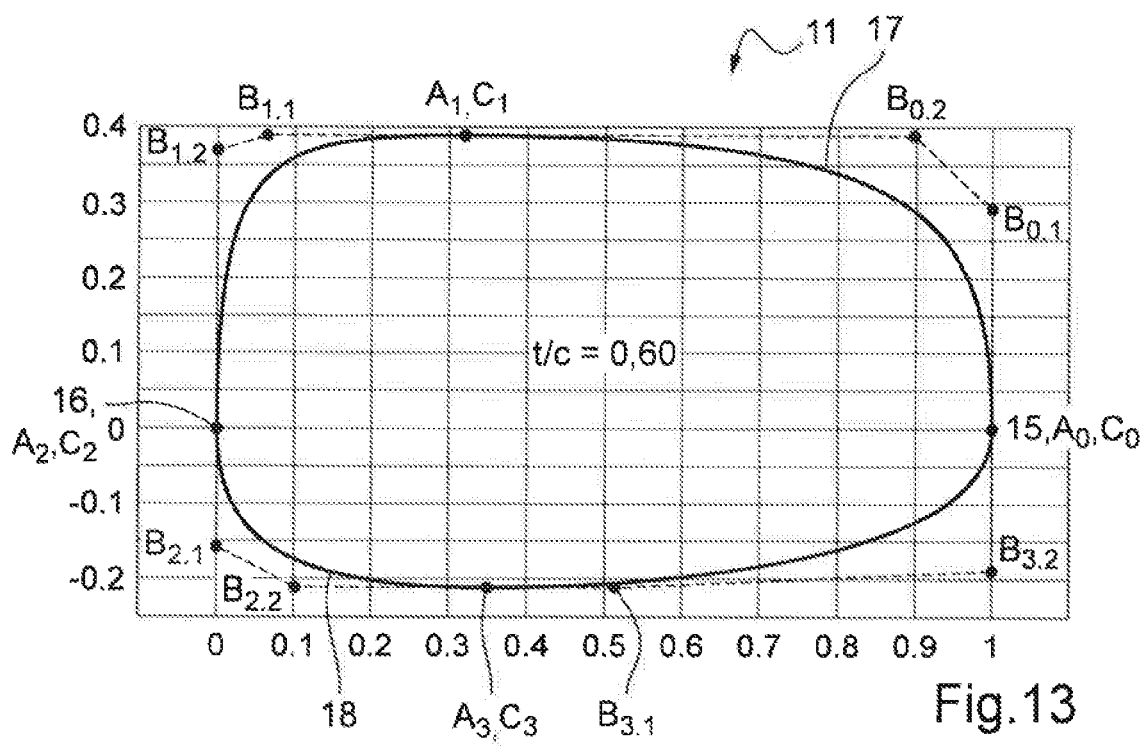
Figure 14:
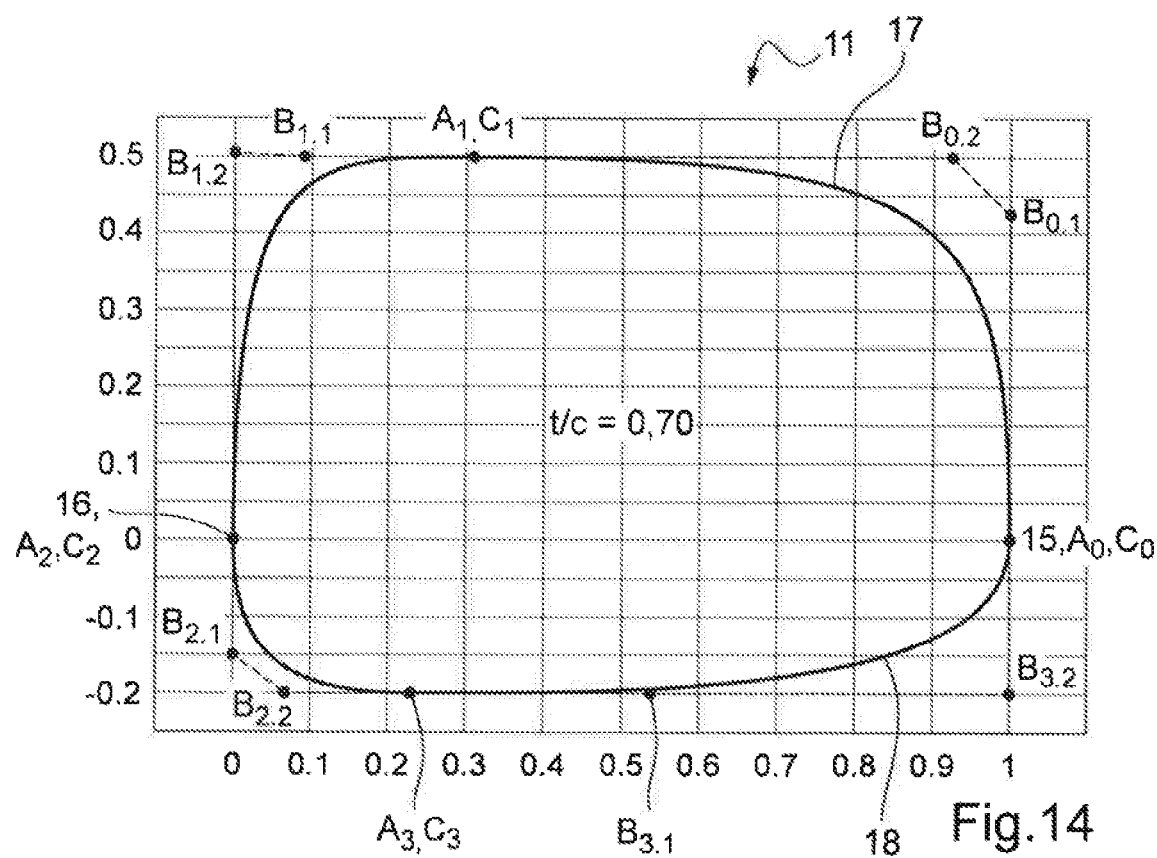
Figure 15:
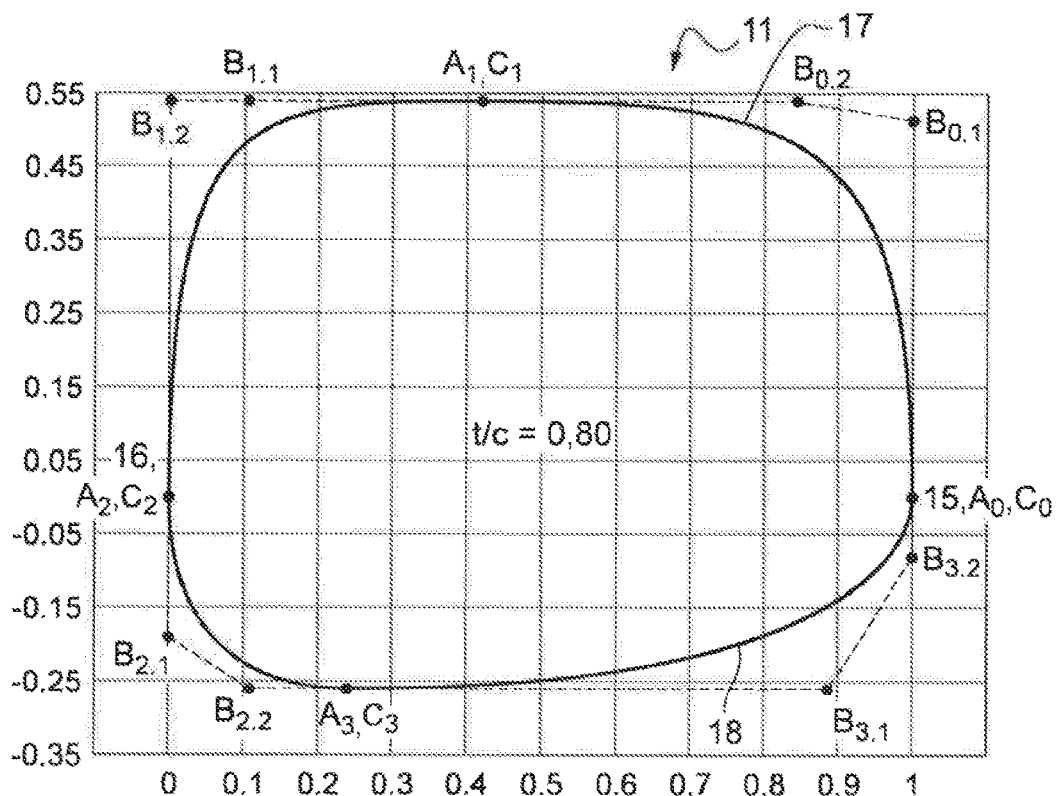
Figure 16:
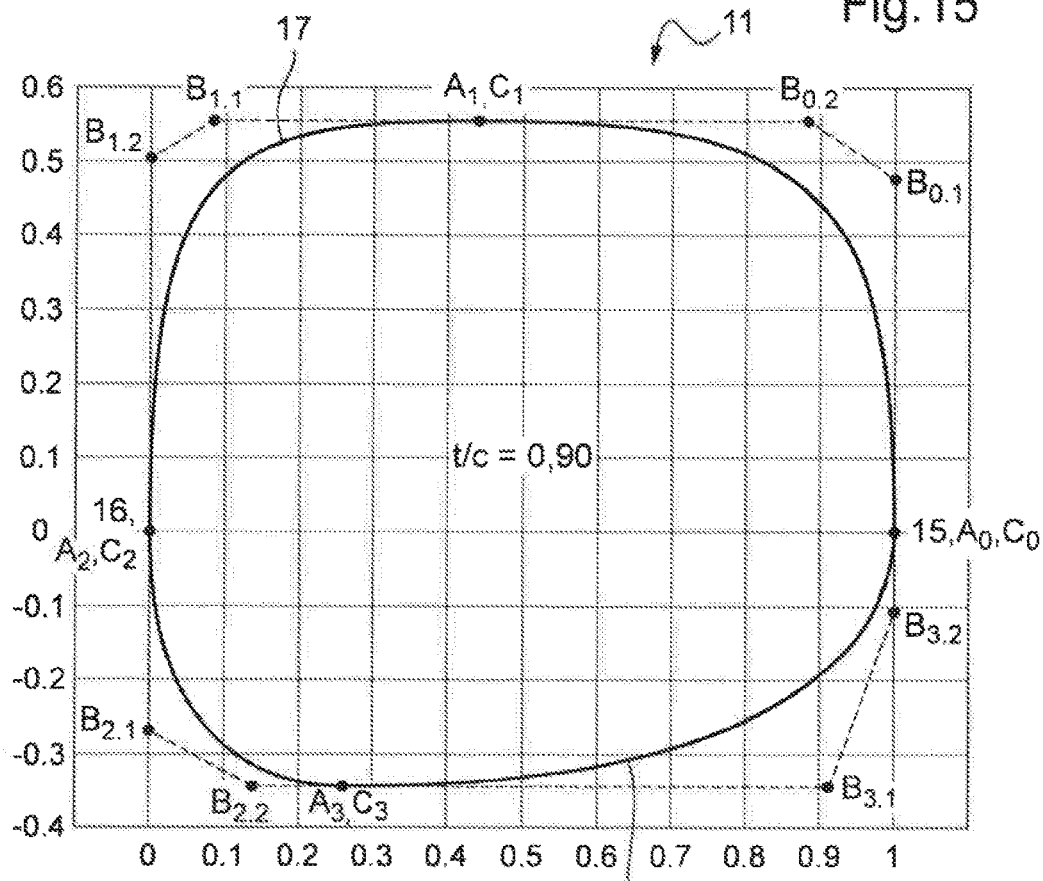
Figure 17:
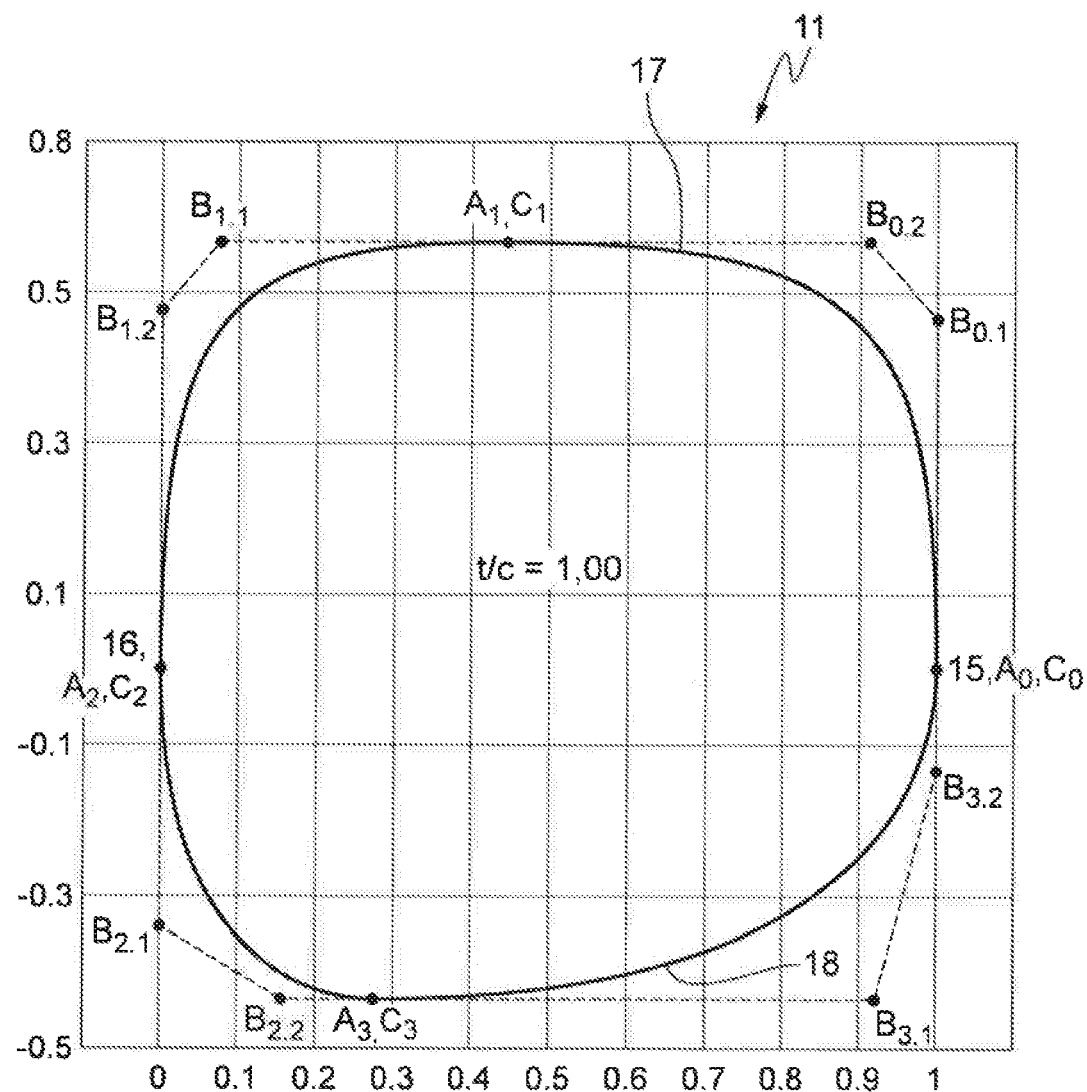
Figure 18:
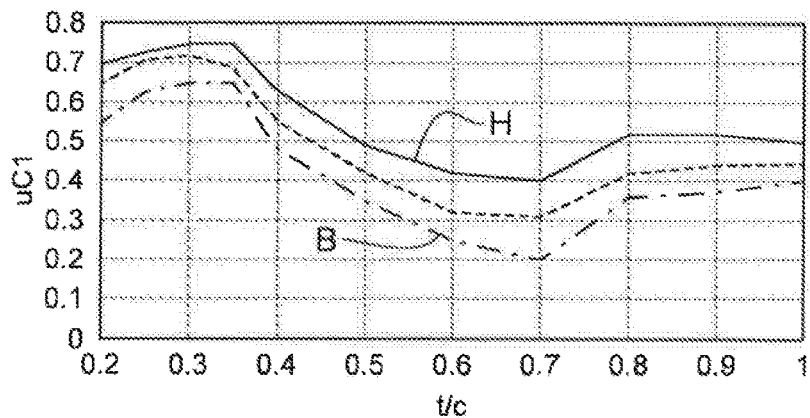
FIGS. 18 to 21 are curves showing variations in the coordinates of extreme points of the airfoil profiles of thick airfoil shapes.
Figure 19:
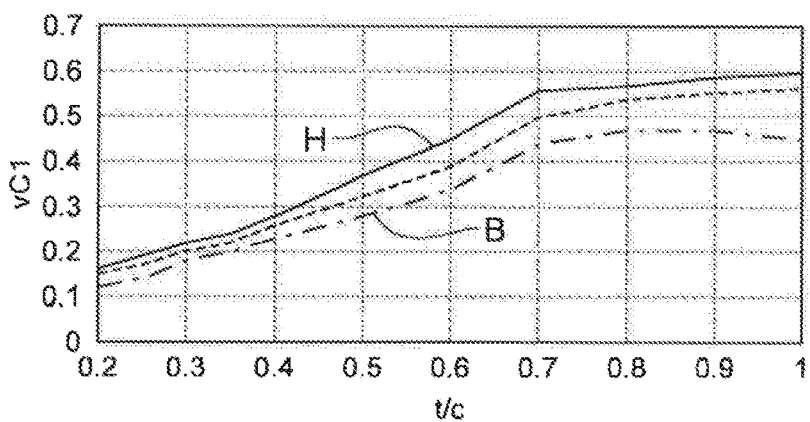
Figure 20:
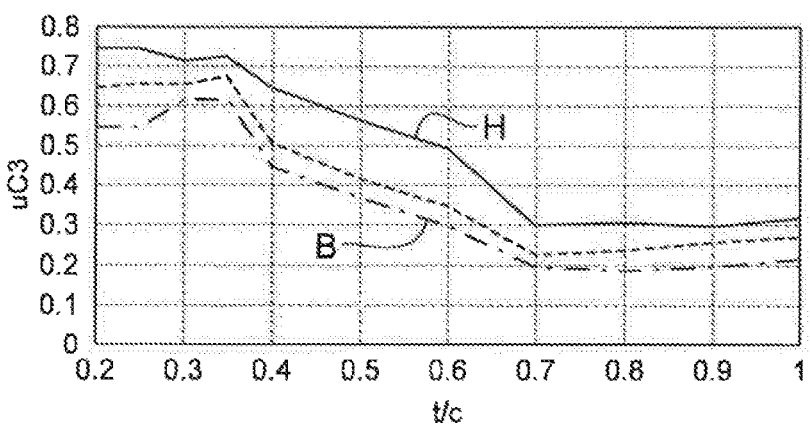
Figure 21:
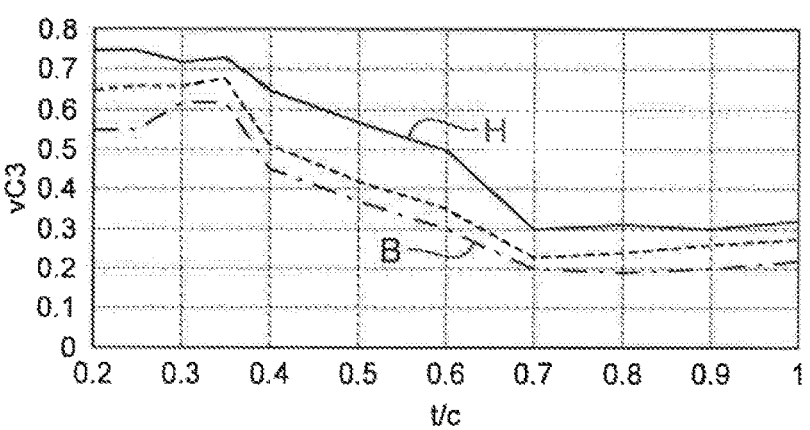

FIG. 5 shows a portion of a blade 2 having a blade neck 23 formed by a thick airfoil shape 1.

In FIGS. 4 and 5, each blade 2 and each thick airfoil shape 1 extends spanwise along a longitudinal direction X from a first end zone 13 to a second end zone 14. A transverse direction Y is perpendicular to the longitudinal direction X and a direction in elevation Z is defined perpendicularly to the longitudinal and transverse directions X and Y in order to form a right-handed rectangular reference frame (X, Y, Z). A transverse plane $P_{YZ}$ perpendicular to the longitudinal direction X is also defined by the transverse direction Y and by the direction elevation Z.

Each blade 2 and each thick airfoil shape 1 also extend in the transverse direction Y from a leading edge 27, 15 to a trailing edge 26, 16. Each blade 2 and each thick airfoil shape 1 is formed by a succession or airfoil profiles 28, 11 situated in planes parallel to the transverse plane $P_{YZ}$. For the streamlined portion 22 of each blade 2, the airfoil profiles 28 are thin and comprise a leading edge 27 and a trailing edge 26. For the thick airfoil shape 1, regardless of whether it constitutes the blade neck 23 of FIG. 5 or the cuff 25 of FIG. 4, each airfoil profile 11 is thick and comprises a leading edge 15 and a trailing edge 16 together with a suction side profile 17 and a pressure side profile 18. Each thick airfoil profile is defined by a chord c between the leading edge 15 and the trailing edge 16, by a thickness t equal to a maximum distance between the suction side profile 17 and the pressure side profile 18 measured perpendicularly to the chord c, and by a relative thickness t/c equal to the ratio of the maximum thickness t divided by the chord c.

Thick airfoil profiles 11 that are to form a thick airfoil shape 1 that is to constitute either a blade cuff 25 or a blade neck 23 are shown in FIGS. 7 to 17, as a function of their relative thicknesses t/c. The relative thickness t/c of each of these airfoil profiles 11 lies in the range 20% and 100%. In FIGS. 4 and 5, the airfoil profiles 11 used for forming the thick airfoil shape 1 constituting the blade cuff 25 generally have relative thicknesses t/c that are greater than the airfoil profiles 11 used for making up the thick airfoil shapes 1 constituting the blade neck 23.

The radial positions of the airfoil profiles 11 forming such a thick airfoil shape 1 constituting a blade neck 23 or a blade cuff 25 lies for example in the range 3% to 25% of the span of the blade 2, which also corresponds to the radius of the main rotor 10. This radial position is defined relative to the center of rotation of the main rotor 10.

In common manner, each of these thick airfoil profiles 11 passes through extreme points C0, C1, C2, C3 defined in a reference frame (U, V) defined by an abscissa axis U formed by the chord direction c and by an ordinate axis V perpendicular to the abscissa axis U. One unit along the abscissa axis U or along the ordinate axis V is equal to the chord c. It can thus be understood that the chord c of each airfoil profile is of unit size in the (U, V) reference frame.

A first extreme point C0 of coordinates (1, 0) is situated at the leading edge 15, a second extreme point C2 of coordinates (0, 0) is situated at the trailing edge 16, and the third and fourth extreme points C1, C3 form the maximum thickness t of the airfoil profile 11. Furthermore, the tangents to each airfoil profile 11 at the first and second extreme points C0, C2 are defined parallel to the ordinate axis V, whereas the tangents at the third and fourth extreme points C1, C3 are defined parallel to the abscissa axis U.

Furthermore, the positions of the third and fourth extreme points C1, C3 in the reference frame (U, V) are constrained so as to improve the penetration of the thick airfoil shape 1 into the air stream for a retreating blade 2, but without degrading that penetration into the air stream for an advancing blade 2. Consequently, this thick airfoil shape 1 is advantageously adapted to very different flow conditions corresponding to the different positions in azimuth of the blade 2 during one complete revolution of the main rotor 10.

The abscissa coordinates of the third and fourth extreme points C1, C3 lie in particular in a first range [0.15c, 0.85c] and the ordinate coordinate of the third extreme point C1 lies in a second range [0.02(t/c), 0.98(t/c)]. More precisely, the coordinates (uCi, vCi) of the third and fourth extreme points C1, C3 in the (U, V) reference frame are defined as a function of the relative thickness t/c and they are situated in ranges bounded by low and high values B and H as given in the following table:

| t/c | | $uC_1$ | $vC_1$ | $uC_3$ | $vC_3$ |
|---|---|---|---|---|---|
| 20% | B | 0.55 | 0.12 | 0.55 | −0.08 |
|     | H | 0.70 | 0.16 | 0.75 | −0.04 |
| 25% | B | 0.63 | 0.14 | 0.55 | −0.11 |
|     | H | 0.73 | 0.19 | 0.75 | −0.06 |
| 30% | B | 0.65 | 0.18 | 0.62 | −0.12 |
|     | H | 0.75 | 0.22 | 0.72 | −0.08 |
| 35% | B | 0.65 | 0.20 | 0.62 | −0.15 |
|     | H | 0.75 | 0.24 | 0.73 | −0.11 |
| 40% | B | 0.48 | 0.23 | 0.45 | −0.17 |
|     | H | 0.63 | 0.28 | 0.65 | −0.12 |
| 50% | B | 0.35 | 0.28 | 0.37 | −0.22 |
|     | H | 0.49 | 0.37 | 0.57 | −0.13 |
| 60% | B | 0.25 | 0.34 | 0.30 | −0.26 |
|     | H | 0.42 | 0.45 | 0.50 | −0.15 |
| 70% | B | 0.20 | 0.44 | 0.20 | −0.26 |
|     | H | 0.40 | 0.56 | 0.30 | −0.14 |
| 80% | B | 0.36 | 0.47 | 0.19 | −0.33 |
|     | H | 0.52 | 0.57 | 0.31 | −0.23 |
| 90% | B | 0.37 | 0.47 | 0.20 | −0.43 |
|     | H | 0.52 | 0.59 | 0.30 | −0.31 |
| 100% | B | 0.40 | 0.45 | 0.22 | −0.55 |
|      | H | 0.50 | 0.60 | 0.32 | −0.40 |

Each thick airfoil profile 11 as defined in this way serves advantageously to improve the aerodynamic behavior of the thick airfoil profile 11, while limiting separations of the air stream sweeping both from the leading edge 15 towards the trailing edge 16 and also from the trailing edge 16 towards the leading edge 15. Consequently, the aerodynamic drag of each thick airfoil profile 11 is minimized, in particular for an air stream sweeping it from the trailing edge 16 towards the leading edge 15, in particular by eliminating the aerodynamic drag peaks that appear conventionally over thick airfoil profiles. Furthermore, the production of wake by each thick airfoil profile 11 is reduced while enabling lift to appear. Furthermore, the lift-to-drag ratio of each thick airfoil profile 11 is maximized for an air stream sweeping over it from the leading edge 15 towards the trailing edge 16.

Graphical representations of the low and high limits B and H respectively for the coordinates uCi, vCi of these third and fourth extreme points C1, C3 are also shown in FIGS. 18 to 21 as a function of the relative thickness t/c of the airfoil profile 11. A curve corresponding to values optimized respectively for these coordinates uCi, vCi of the third and fourth extreme points C1, C3 is also given in FIGS. 18 to 21. These optimized values for the coordinates uCi, vCi of the third and fourth extreme points C1, C3 are defined in the following table:

| t/c | $uC_1$ | $vC_1$ | $uC_3$ | $vC_3$ |
|---|---|---|---|---|
| 20% | 0.65 | 0.148 | 0.65 | −0.052 |
| 25% | 0.71 | 0.17 | 0.66 | −0.08 |
| 30% | 0.72 | 0.20 | 0.66 | −0.10 |
| 35% | 0.69 | 0.22 | 0.68 | −0.13 |
| 40% | 0.55 | 0.26 | 0.51 | −0.14 |
| 50% | 0.42 | 0.325 | 0.42 | −0.175 |
| 60% | 0.32 | 0.39 | 0.35 | −0.21 |
| 70% | 0.31 | 0.50 | 0.23 | −0.20 |
| 80% | 0.42 | 0.54 | 0.24 | −0.28 |
| 90% | 0.44 | 0.555 | 0.26 | −0.345 |
| 100% | 0.445 | 0.565 | 0.275 | −0.435 |

Figure 6:
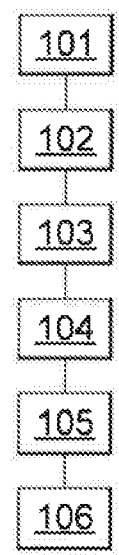
FIG. 6 is a block diagram of a method of obtaining a thick airfoil shape.

These thick airfoil profiles 11 can be obtained by a method of obtaining a thick airfoil shape 1 that is outlined in FIG. 6. This method of obtaining a thick airfoil shape 1 comprises three main steps 101, 102, and 103, together with additional steps 104, 105, and 106, the main steps serving to determine each airfoil profile 11 of the thick airfoil shape 1, and the additional steps 104, 105, and 106, which are optional, serving to fabricate a thick airfoil shape 1.

In a first creation first step 101 characteristic points Ai belonging to the airfoil profile 11 are created, each characteristic point Ai being defined in the reference frame (U, V). In the context of the airfoil profiles shown in FIGS. 7 to 17, four characteristic points A0, A1, A2, A3 corresponding respectively to the extreme points C0, C1, C2, C3 are created during this first creation first step 101.

During a second creation second step 102 control points Bi.j are created, i being a positive integer lying in the range 0 to m, (m+1) being the number of characteristic points Ai used, j being a positive integer lying in the range 1 to n, n being a positive integer greater than or equal to 1, where the control points Bi.j are construction points for constructing the airfoil profile 11 between two consecutive characteristic points Ai, Ai+1, with (i+1) being replaced by the value zero "0" when i is equal to m.

In the context of the airfoil profiles shown in FIGS. 7 to 17, four characteristic points A0, A1, A2, A3 have been created during the first creation first step 101, with the positive integer i varying in the range 0 to 3. Furthermore, two control points Bi.1, Bi.2 are created for each characteristic point Ai during the second creation second step 102.

Thereafter, in a determination third step 103 for determining the airfoil profile 11, (m+1) curves, e.g. (m+1) Bezier curves 41-44 of order n+1, are constructed from the characteristic points Ai and the control points Bi.j so as to connect together respectively two consecutive characteristic points Ai, Ai+1 and thereby form the airfoil profile 11.

In the context of the airfoil profiles shown in FIGS. 7 to 17, after that two control points Bi.1, Bi.2 have been created for each characteristic point Ai during the second creation second step 102, four Bezier curves 41-44 of order 3 are constructed during the determination third step 103.

The method of obtaining a thick airfoil shape 1 can also include a simulation first additional step 104 for simulating the aerodynamic behavior of the airfoil profile 11 when it is swept by a first air stream from the leading edge 15 towards the trailing edge 16 and when it is swept by a second air stream from the trailing edge 16 towards the leading edge 15. The previously determined thick airfoil profile 11 might then be validated during this simulation first additional step 104, or else a new iteration of the main steps 101, 102, and 103 of the method is performed.

The method of obtaining a thick airfoil shape 1 may also include a definition second additional step 105 for defining the thick airfoil shape 1 by combining airfoil profiles 11 defined during the determination third step 103 for determining the airfoil profile 11.

The method of obtaining a thick airfoil shape 1 may then include an obtaining third additional step 106 for actually obtaining the thick airfoil shape 1, this thick airfoil shape 1 being made up of the thick airfoil profiles 11 previously determined during the determination third step 103. By way of example, the thick airfoil profiles are used for making the mold for fabricating the thick airfoil shape 1, or else for machining said thick airfoil shape 1. As a result, such a thick airfoil shape 1 can be used as a blade neck 23 or a blade cuff 25 and can be arranged between the rotary hub 3 of a main rotor 10 of an aircraft 5 and each of the blades 2 of the main rotor 10.

FIGS. 7 to 17 show example thick airfoil profiles 11 defined by this method of obtaining a thick airfoil shape 1 for relative thicknesses t/c lying in the range 20% to 100%. The four Bezier curves 41-44 are of order 3. In addition, each control point Bi.j is situated in a zone representing a third range [−25%, 125%] of a zone covered by the two consecutive characteristic points Ai, Ai+1 so as to avoid excessive curvature for each airfoil profile 11 and also so as to avoid the appearance of any points of inflection or cusps in the airfoil profile 11 while determining 103 the airfoil profile 11.

The values of the characteristic points A0, A1, A2, A3 and of the control points B0.1, B0.2, B1.1, B1.2, B2.1, B2.2, B3.1, B3.2 serving to define the Bezier curves 41-44 of order 3 and consequently serving to construct each of these airfoil profiles 11 are defined as a function of the relative thickness t/c of the airfoil profile 11. The control points Bi.j are defined by coefficients CuBi.j, CvBi.j defining their positions relative to two consecutive characteristic points Ai, Ai+1. Each coefficient CuBi.j, CvBi.j is multiplied by the distance between the two characteristic points Ai, Ai+1 parallel respectively to the abscissa axis U and to the ordinate axis V in order to define the position of the control point Bi.j relative to the characteristic point Ai parallel respectively to these abscissa and ordinate axes U and V.

FIGS. 7 to 17 show examples of thick airfoil profiles 11 defined for each of the relative thicknesses t/c given in the following table:

| t/c | CvB0.1 | CuB0.2 | CuB1.1 | CvB1.2 | CuB2.1 | CuB2.2 | CvB3.1 | CuB3.2 |
|---|---|---|---|---|---|---|---|---|
| 20% | 0.85 | 0.22 | 0.37 | 0 | 0.60 | 0 | 0.70 | 0.10 |
| 25% | 0.85 | 0.42 | 0.81 | 0.42 | 0.50 | 0.22 | 0.85 | 0.69 |
| 30% | 0.38 | 0.13 | 0.44 | 0.16 | 0.49 | 0.24 | 0.85 | 0.65 |
| 35% | 0.81 | 0.44 | 0.66 | 0.24 | 0.34 | 0.22 | 0.85 | 0.65 |
| 40% | 0.97 | 0.45 | 0.76 | 0.20 | 0.91 | 0.54 | 0.85 | 0.54 |
| 50% | 0.83 | 0.21 | 0.76 | 0.07 | 0.93 | 0.56 | 0.88 | 0.54 |
| 60% | 0.75 | 0.15 | 0.80 | 0.05 | 0.75 | 0.29 | 0.25 | 0.10 |
| 70% | 0.85 | 0.11 | 0.71 | −0.01 | 0.75 | 0.29 | 0.40 | 0 |
| 80% | 0.95 | 0.27 | 0.75 | 0 | 0.73 | 0.45 | 0.85 | 0.69 |
| 90% | 0.86 | 0.21 | 0.81 | 0.09 | 0.78 | 0.53 | 0.88 | 0.69 |
| 100% | 0.82 | 0.16 | 0.83 | 0.16 | 0.78 | 0.57 | 0.89 | 0.69 |

At the leading edge 15, the resulting thick airfoil profiles 11, and regardless of their relative thickness t/c, present a very marked bulge over the suction side profile 17 and a swept-back shape over the pressure side profile 18. The suction side and pressure profiles 17 and 18 are more rounded at the trailing edge 16, given the targets for minimizing the aerodynamic drag of a retreating blade.

As a result, each thick airfoil profile 11 possesses optimized aerodynamic behavior limiting any separation of the air stream sweeping over it. In particular, the aerodynamic drag of each thick airfoil profile 11 is minimized for an air stream sweeping over it from the trailing edge 16 towards the leading edge 15 and its lift-to-drag ratio is maximized for an air stream sweeping over it from the leading edge 15 towards the trailing edge 16, while allowing lift to appear over the thick airfoil profile 11.

In particular, the lift-to-drag ratio of each thick airfoil profile 11 is maximized, e.g. at a positive angle of incidence lying in the range 8 degrees to 12 degrees. Likewise, its aerodynamic drag is minimized, e.g. for a positive angle of incidence lying in the range 168 degrees to 174 degrees.

Furthermore, intermediate thick airfoil profiles 11 of intermediate relative thicknesses t/c, but not given in the above tables, can be obtained by interpolating between two thick airfoil profiles provided in the tables having lower and upper relative thickness $(t/c)_{min}$ and $(t/c)_{max}$ on either side of the intermediate relative thickness t/c. The coordinates (u, v) of each point of such an intermediate thick airfoil profile 11 are defined from points $(u, v_{min})$ and $(u, v_{max})$ of two thick airfoil profiles 11 having respectively a lower relative thickness $(t/c)_{min}$ and an upper relative thickness $(t/c)_{max}$. The ordinate coordinate v of each point (u, v) of the intermediate thick airfoil profile 11 is determined by interpolation as a function of the ordinate coordinates $v_{min}$, $v_{max}$ of the points $(u, v_{min})$ and $(u, v_{max})$ of the thick airfoil profiles 11 built up from the above tables, e.g. using the following relationship:

$$v = \frac{\left(\frac{t}{c}\right) - \left(\frac{t}{c}\right)_{min}}{\left(\frac{t}{c}\right)_{max} - \left(\frac{t}{c}\right)_{min}} v_{max} + \left(1 - \frac{\left(\frac{t}{c}\right) - \left(\frac{t}{c}\right)_{min}}{\left(\frac{t}{c}\right)_{max} - \left(\frac{t}{c}\right)_{min}}\right) v_{min}$$

$v_{min}$ being a first ordinate coordinate for the point of the first airfoil profile having the same abscissa coordinate u as the point of coordinates (u, v) of the intermediate thick airfoil profile and $v_{max}$ being a second ordinate coordinate for the point of the second airfoil profile having the same abscissa coordinate u as the point of coordinates (u, v) of the intermediate thick airfoil profile.

Naturally, the present invention may be subjected to numerous variations as to its implementation. Although several embodiments are described, it will readily be understood that it is not conceivable to identify exhaustively all possible embodiments.

A main rotor 10 may in particular have blade cuffs 25 constituted respectively by thick airfoil shapes 1 of the invention as shown in FIG. 3, while the blade necks 23 are in accordance with the prior art. A main rotor 10 may also have blade necks 23 that are constituted by respective thick airfoil shapes 1 as shown in FIG. 4, while the blade cuffs 25 are then be in accordance with the prior art.

A main rotor 10 may also have simultaneously both blade cuffs 25 and blade necks 23 constituted by respective thick airfoil shapes 1 of the invention, as shown in FIG. 2.

Furthermore, a thick airfoil shape 1 of the invention may form a blade cuff 25 and/or a blade neck 23 of a lift main rotor 10, as described above with reference to the figures, but it could equally constitute a blade cuff 25 and/or a blade neck 23 of an anti-torque tail rotor or indeed a propulsive propeller of an aircraft.

It is naturally possible to envisage replacing any of the means described by equivalent means without going beyond the ambit of the present invention.

What is claimed is:

1. A blade having a blade root, a blade element, and a streamlined portion, the blade element for being arranged between a rotary hub of a rotor of an aircraft and the streamlined portion of the blade, the blade element being either a blade neck for connecting the blade root to the streamlined portion or a blade cuff for fairing a structural junction device for connecting the blade root to the rotary hub, the blade element having a thick airfoil shape extending firstly spanwise in a longitudinal direction from a first end zone towards a second end zone, and secondly in a transverse direction (Y) from a leading edge to a trailing edge, the thick airfoil shape being made up of a succession of thick airfoil profiles situated in planes parallel to a transverse plane ($P_{YZ}$) perpendicular to the spanwise longitudinal direction (X), each thick airfoil profile having a suction side profile and a pressure side profile, each thick airfoil profile being defined by a chord c between the leading edge and the trailing edge, by a maximum thickness t equal to a maximum distance between the suction side profile and the pressure side profile measured perpendicularly to the chord c, and by a relative thickness t/c equal to the ratio of the maximum thickness t divided by the chord c, the relative thickness t/c being greater than or equal to 20% for each thick airfoil profile, each airfoil profile passing via extreme points (C0, C1, C2, C3), each extreme point (C0, C1, C2, C3) being defined in a reference frame (U, V) attached to the airfoil profile and itself defined by an abscissa axis (U) formed by the direction of the chord c and by an ordinate axis (V) perpendicular to the abscissa axis (U), one unit of the abscissa and ordinate axes (U, V) being equal to the chord c, a first extreme point (C0) of coordinates being situated at the leading edge, a second extreme point (C2) of coordinates being situated at the trailing edge, and third and fourth extreme points (C1, C3) forming the maximum thickness t of the airfoil profile, tangents to each airfoil profile (11) at the third and fourth extreme points (C1, C3) being defined parallel to the abscissa axis (U);

wherein the coordinates (uCi, vCi) of the third and fourth extreme points (C1, C3) in the reference frame (U, V) are defined as a function of the relative thickness t/c and are situated within ranges bounded by low values (B) and high values (H) given in the following table:

| t/c | | $uC_1$ | $vC_1$ | $uC_3$ | $vC_3$ |
|---|---|---|---|---|---|
| 20% | B | 0.55 | 0.12 | 0.55 | −0.08 |
|  | H | 0.70 | 0.16 | 0.75 | −0.04 |
| 25% | B | 0.63 | 0.14 | 0.55 | −0.11 |
|  | H | 0.73 | 0.19 | 0.75 | −0.06 |
| 30% | B | 0.65 | 0.18 | 0.62 | −0.12 |
|  | H | 0.75 | 0.22 | 0.72 | −0.08 |
| 35% | B | 0.65 | 0.20 | 0.62 | −0.15 |
|  | H | 0.75 | 0.24 | 0.73 | −0.11 |
| 40% | B | 0.48 | 0.23 | 0.45 | −0.17 |
|  | H | 0.63 | 0.28 | 0.65 | −0.12 |
| 50% | B | 0.35 | 0.28 | 0.37 | −0.22 |
|  | H | 0.49 | 0.37 | 0.57 | −0.13 |
| 60% | B | 0.25 | 0.34 | 0.30 | −0.26 |
|  | H | 0.42 | 0.45 | 0.50 | −0.15 |
| 70% | B | 0.20 | 0.44 | 0.20 | −0.26 |
|  | H | 0.40 | 0.56 | 0.30 | −0.14 |
| 80% | B | 0.36 | 0.47 | 0.19 | −0.33 |
|  | H | 0.52 | 0.57 | 0.31 | −0.23 |
| 90% | B | 0.37 | 0.47 | 0.20 | −0.43 |
|  | H | 0.52 | 0.59 | 0.30 | −0.31 |
| 100% | B | 0.40 | 0.45 | 0.22 | −0.55 |
|  | H | 0.50 | 0.60 | 0.32 | −0.40 |

2. The blade according to claim 1, wherein for each airfoil profile, optimized values for the coordinates (uCi, vCi) of the third and fourth extreme points (C1, C3) are defined as a function of the relative thickness t/c of the airfoil profile (11) in the following table:

| t/c | uC₁ | vC₁ | uC₃ | vC₃ |
|---|---|---|---|---|
| 20% | 0.65 | 0.148 | 0.65 | −0.052 |
| 25% | 0.71 | 0.17 | 0.66 | −0.08 |
| 30% | 0.72 | 0.20 | 0.66 | −0.10 |
| 35% | 0.69 | 0.22 | 0.68 | −0.13 |
| 40% | 0.55 | 0.26 | 0.51 | −0.14 |
| 50% | 0.42 | 0.325 | 0.42 | −0.175 |
| 60% | 0.32 | 0.39 | 0.35 | −0.21 |
| 70% | 0.31 | 0.50 | 0.23 | −0.20 |
| 80% | 0.42 | 0.54 | 0.24 | −0.28 |
| 90% | 0.44 | 0.555 | 0.26 | −0.345 |
| 100% | 0.445 | 0.565 | 0.275 | −0.435 |

3. The blade according to claim 1, wherein the tangents of each airfoil profile at the leading edge and at the trailing edge are defined parallel to the ordinate axis (V).

4. The blade according to claim 1, wherein the coordinates (u, v) of each point forming an intermediate thick airfoil profile having an intermediate relative thickness t/c lying between lower and upper relative thicknesses $(t/c)_{min}$ and $(t/c)_{max}$ are defined by interpolation from a first airfoil profile (11) having the lower relative thickness $(t/c)_{min}$ and a second airfoil profile having the upper relative thickness $(t/c)_{max}$.

5. The blade according to claim 4, wherein the ordinate coordinate v of each point of the intermediate thick airfoil profile of relative thickness t/c is determined by a following relationship:

$$v = \frac{\left(\frac{t}{c}\right)-\left(\frac{t}{c}\right)_{min}}{\left(\frac{t}{c}\right)_{max}-\left(\frac{t}{c}\right)_{min}} v_{max} + \left(1 - \frac{\left(\frac{t}{c}\right)-\left(\frac{t}{c}\right)_{min}}{\left(\frac{t}{c}\right)_{max}-\left(\frac{t}{c}\right)_{min}}\right) v_{min}$$

$v_{min}$ being a first ordinate coordinate for a point of the first airfoil profile having the same abscissa coordinate u as the point of coordinates (u, v) of the intermediate airfoil profile, and $v_{max}$ being a second ordinate coordinate for a point of the second airfoil profile having the same abscissa coordinate u as the point of coordinates (u, v) of the intermediate thick airfoil profile.

6. The blade according to claim 1, wherein the blade element is a blade neck connecting the blade root to the streamlined portion.

7. An aircraft assembly comprising a rotor having a rotary hub and at least two blades according to claim 1, the blade element of each blade being a blade neck connecting the blade root of the blade to the streamlined portion of the blade so as to reduce the production of wake by the rotor, so as to limit the amplitude of unsteadinesses contained in the wake, and so as to reduce a frequency signature of the wake.

8. An aircraft assembly comprising a rotor having a rotary hub and at least two blades according to claim 1, the blade element of each blade being a blade cuff fairing a structural junction device respectively connecting each blade to the rotary hub so as to reduce the production of wake by the rotor, so as to limit the amplitude of unsteadinesses contained in the wake, and so as to reduce a frequency signature of the wake.

9. A rotary wing aircraft comprising a fuselage, a tail boom, at least one stabilizer, and the aircraft assembly according to claim 7 so that firstly it reduces the production of wake from the rotor and unsteadinesses of the wake, and secondly it limits the appearance of vibration in the tail boom and/or the at least one stabilizer as generated by the wake.

10. A method of making a blade element for a blade having a blade root and a streamlined portion, the blade element for being arranged between a rotary hub of a rotor of an aircraft and the streamlined portion of the blade, the blade element to be either a blade neck for connecting the blade root to the streamlined portion or a blade cuff for fairing a structural junction device for connecting the blade root to the rotary hub, the blade element to be constituted by a thick airfoil shape extending firstly spanwise in a longitudinal direction (X) from a first end zone towards a second end zone, and secondly in a transverse direction (Y) from a leading edge to a trailing edge, the thick airfoil shape to be made up of a succession of thick airfoil profiles situated in planes parallel to a transverse plane $(P_{yz})$ perpendicular to the spanwise longitudinal direction (X), each thick airfoil profile having a suction side profile and a pressure side profile, each thick airfoil profile being defined by a chord c between the leading edge and the trailing edge, by a maximum thickness t equal to a maximum distance between the suction side profile and the pressure side profile measured perpendicularly to the chord c, and by a relative thickness t/c equal to the ratio of the maximum thickness t divided by the chord c, the relative thickness t/c being greater than or equal to 20% for each thick airfoil profile;

wherein the method comprises the following steps for defining each airfoil profile:

a first creation step for creating (m+1) characteristic points (A0, . . . , Ai, . . . , Am) belonging to the airfoil profile (11), i being a positive integer lying in the range 0 to m, each characteristic point (Ai) being defined in a reference frame (U, V) attached to the airfoil profile and defined by an abscissa axis (U) formed by the direction of the chord c and by an ordinate axis (V) perpendicular to the abscissa axis (U), one unit of the abscissa and ordinate axes (U, V) being equal to the chord c;

a second creation step (102) for creating control points (Bi.j), n control points (Bi.j) being situated respectively between two consecutive characteristic points (Ai, Ai+1) and being construction points for constructing the airfoil profile between the two constructive characteristic points (Ai, Ai+1), n being a positive integer greater than or equal to 2, j being a positive integer lying in the range 1 to n, (i+1) being replaced by the value zero "0" when i is equal to m; and a determination step for determining the airfoil profile, (m+1) curves respectively connecting together two consecutive characteristic points (Ai, Ai+1) and being constructed from the control points (Bi.j), the (m+1) curves (41-44) being connected in pairs to form the airfoil profile, the airfoil profile passing through extreme points (C0, C1, C2, C3), a first extreme point (C0) of coordinates being situated at the leading edge, a second extreme point (C2) of coordinates being situated at the trailing edge, and third and fourth extreme points (C1, C3) forming the maximum thickness t of the airfoil profile, the tangents of each airfoil profile at the third and fourth extreme points (C1, C3) being defined parallel to the abscissa axis (U), and the coordinates (uCi, vCi) of the third and fourth extreme points (C1, C3) in the reference frame (U, V) being defined as a function of the relative thickness t/c and being situated within ranges bounded by low values (B) and high values (H) given in the following table:

| t/c | | $uC_1$ | $vC_1$ | $uC_3$ | $vC_3$ |
|---|---|---|---|---|---|
| 20% | B | 0.55 | 0.12 | 0.55 | −0.08 |
|  | H | 0.70 | 0.16 | 0.75 | −0.04 |
| 25% | B | 0.63 | 0.14 | 0.55 | −0.11 |
|  | H | 0.73 | 0.19 | 0.75 | −0.06 |
| 30% | B | 0.65 | 0.18 | 0.62 | −0.12 |
|  | H | 0.75 | 0.22 | 0.72 | −0.08 |
| 35% | B | 0.65 | 0.20 | 0.62 | −0.15 |
|  | H | 0.75 | 0.24 | 0.73 | −0.11 |
| 40% | B | 0.48 | 0.23 | 0.45 | −0.17 |
|  | H | 0.63 | 0.28 | 0.65 | −0.12 |
| 50% | B | 0.35 | 0.28 | 0.37 | −0.22 |
|  | H | 0.49 | 0.37 | 0.57 | −0.13 |
| 60% | B | 0.25 | 0.34 | 0.30 | −0.26 |
|  | H | 0.42 | 0.45 | 0.50 | −0.15 |
| 70% | B | 0.20 | 0.44 | 0.20 | −0.26 |
|  | H | 0.40 | 0.56 | 0.30 | −0.14 |
| 80% | B | 0.36 | 0.47 | 0.19 | −0.33 |
|  | H | 0.52 | 0.57 | 0.31 | −0.23 |
| 90% | B | 0.37 | 0.47 | 0.20 | −0.43 |
|  | H | 0.52 | 0.59 | 0.30 | −0.31 |
| 100% | B | 0.40 | 0.45 | 0.22 | −0.55 |
|  | H | 0.50 | 0.60 | 0.32 | −0.40 |

-continued

| t/c | $uC_1$ | $vC_1$ | $uC_3$ | $vC_3$ |
|---|---|---|---|---|
| 80% | 0.42 | 0.54 | 0.24 | −0.28 |
| 90% | 0.44 | 0.555 | 0.26 | −0.345 |
| 100% | 0.445 | 0.565 | 0.275 | −0.435 | the method further comprising making a mold according to the determined airfoil profiles and using the mold to fabricate the blade element.

11. The method according to claim 10, wherein for each airfoil profile, optimized values for the coordinates (uCi, vCi) of the third and fourth extreme points (C1, C3) are defined as a function of the relative thickness t/c of the airfoil profile in the following table:

| t/c | $uC_1$ | $vC_1$ | $uC_3$ | $vC_3$ |
|---|---|---|---|---|
| 20% | 0.65 | 0.148 | 0.65 | −0.052 |
| 25% | 0.71 | 0.17 | 0.66 | −0.08 |
| 30% | 0.72 | 0.20 | 0.66 | −0.10 |
| 35% | 0.69 | 0.22 | 0.68 | −0.13 |
| 40% | 0.55 | 0.26 | 0.51 | −0.14 |
| 50% | 0.42 | 0.325 | 0.42 | −0.175 |
| 60% | 0.32 | 0.39 | 0.35 | −0.21 |
| 70% | 0.31 | 0.50 | 0.23 | −0.20 |

12. The method according to claim 10, wherein the control points (Bi.j) are situated in a zone representing a third range [−25%, 125%] of a zone covered by the two consecutive characteristic points (Ai, Ai+1) so as to avoid excessive curvature for each airfoil profile and so as to avoid the appearance of points of inflection or of cusps in the airfoil profile during the determination of the airfoil profile.

13. The method according to claim 10, wherein during the first creation step, the tangents of the airfoil profile at the first and second extreme points (C0, C2) are defined as parallel to the ordinate axis (V).

14. The method according to claim 10, wherein during the first creation step, four characteristic points (A0, A1, A2, A3) are created, the characteristic points (A0, A1, A2, A3) being the extreme points (C0, C1, C2, C3).

15. The method according to claim 14, wherein the four curves (41-44) are constituted by Bezier curves of order 3, the tangents to the airfoil profile at the first and second characteristic points (A0, A2) are defined parallel to the ordinate axis (V), and the control points (B0.1, B0.2, B1.1, B1.2, B2.1, B2.2, B3.1, B3.2) are defined as a function of the relative thickness t/c and in accordance with the table below which defines for the control points (Bi.j), variation ranges bounded by low and high values (B, H) for the coefficients (CuBi.j, CvBi.j), the coefficients (CuBi.j, CvBi.j) defining the positions of the control points (Bi.j) relative to the pairs of consecutive characteristic points (Ai, Ai+1), each coefficient (CuBi.j, CvBi.j) being multiplied by a distance between the pair of consecutive characteristic points (Ai, Ai+1) in parallel respectively with the abscissa axis (U) and the ordinate axis (V) in order to define the position of the control point (Bi.j) relative to the characteristic point (Ai) in parallel respectively with the abscissa axis (U) and the ordinate axis (V):

| t/c | | $CvB_{0.1}$ | $CuB_{0.2}$ | $CuB_{1.1}$ | $CvB_{1.2}$ | $CvB_{2.1}$ | $CuB_{2.2}$ | $CvB_{3.1}$ | $CuB_{3.2}$ |
|---|---|---|---|---|---|---|---|---|---|
| 20% | B | 0.80 | 0.10 | 0.30 | −0.10 | 0.50 | 0 | 0.65 | 0 |
|  | H | 0.90 | 0.25 | 0.40 | 0.10 | 0.90 | 0.05 | 0.85 | 0.15 |
| 25% | B | 0.80 | 0.30 | 0.80 | 0.30 | 0.40 | 0.20 | 0.80 | 0.50 |
|  | H | 0.90 | 0.50 | 0.85 | 0.60 | 0.80 | 0.30 | 0.90 | 0.80 |
| 30% | B | 0.35 | 0.10 | 0.40 | 0.05 | 0.35 | 0.20 | 0.80 | 0.50 |
|  | H | 0.45 | 0.20 | 0.50 | 0.25 | 0.70 | 0.30 | 0.90 | 0.65 |
| 35% | B | 0.74 | 0.34 | 0.60 | 0.22 | 0.25 | 0.15 | 0.80 | 0.50 |
|  | H | 0.88 | 0.70 | 0.70 | 0.32 | 0.50 | 0.30 | 0.90 | 0.65 |
| 40% | B | 0.85 | 0.35 | 0.65 | 0.12 | 0.77 | 0.45 | 0.70 | 0.37 |
|  | H | 1.10 | 0.52 | 0.86 | 0.24 | 1.10 | 0.65 | 0.95 | 0.65 |
| 50% | B | 0.70 | 0.15 | 0.67 | 0.05 | 0.81 | 0.39 | 0.77 | 0.41 |
|  | H | 0.90 | 0.30 | 0.86 | 0.14 | 1.00 | 0.63 | 0.98 | 0.61 |
| 60% | B | 0.60 | 0.10 | 0.70 | 0.05 | 0.70 | 0.25 | 0.15 | 0.00 |
|  | H | 0.80 | 0.20 | 0.85 | 0.12 | 0.80 | 0.35 | 0.35 | 0.15 |
| 70% | B | 0.75 | 0.08 | 0.65 | −0.03 | 0.70 | 0.25 | 0.22 | −.05 |
|  | H | 0.90 | 0.16 | 0.90 | 0.05 | 0.80 | 0.35 | 0.45 | 0.15 |
| 80% | B | 0.85 | 0.20 | 0.65 | −0.04 | 0.60 | 0.30 | 0.80 | 0.57 |
|  | H | 1.05 | 0.35 | 0.92 | 0.05 | 0.90 | 0.50 | 0.90 | 0.85 |

-continued

| t/c | | CvB$_{0.1}$ | CuB$_{0.2}$ | CuB$_{1.1}$ | CvB$_{1.2}$ | CvB$_{2.1}$ | CuB$_{2.2}$ | CvB$_{3.1}$ | CuB$_{3.2}$ |
|---|---|---|---|---|---|---|---|---|---|
| 90% | B | 0.80 | 0.15 | 0.71 | −0.03 | 0.65 | 0.43 | 0.79 | 0.57 |
| | H | 0.98 | 0.28 | 0.93 | 0.15 | 0.93 | 0.60 | 0.94 | 0.81 |
| 100% | B | 0.75 | 0.10 | 0.75 | 0.00 | 0.65 | 0.50 | 0.77 | 0.60 |
| | H | 0.95 | 0.25 | 0.95 | 0.25 | 1.00 | 0.70 | 0.97 | 0.80 |

16. The method according to claim 15, wherein for each airfoil profile, optimized values for the coefficients (CuBi.j, CvBi.j) of the control points (B0.1, B0.2, B1.1, B1.2, B2.1, B2.2, B3.1, B3.2) are defined as a function of the relative thickness t/c of the airfoil profile in the following table:

| t/c | CvB0.1 | CuB0.2 | CuB1.1 | CvB1.2 | CuB2.1 | CuB2.2 | CvB3.1 | CuB3.2 |
|---|---|---|---|---|---|---|---|---|
| 20% | 0.85 | 0.22 | 0.37 | 0 | 0.60 | 0 | 0.70 | 0.10 |
| 25% | 0.85 | 0.42 | 0.81 | 0.42 | 0.50 | 0.22 | 0.85 | 0.69 |
| 30% | 0.38 | 0.13 | 0.44 | 0.16 | 0.49 | 0.24 | 0.85 | 0.65 |
| 35% | 0.81 | 0.44 | 0.66 | 0.24 | 0.34 | 0.22 | 0.85 | 0.65 |
| 40% | 0.97 | 0.45 | 0.76 | 0.20 | 0.91 | 0.54 | 0.85 | 0.54 |
| 50% | 0.83 | 0.21 | 0.76 | 0.07 | 0.93 | 0.56 | 0.88 | 0.54 |
| 60% | 0.75 | 0.15 | 0.80 | 0.05 | 0.75 | 0.29 | 0.25 | 0.10 |
| 70% | 0.85 | 0.11 | 0.71 | −0.01 | 0.75 | 0.29 | 0.40 | 0 |
| 80% | 0.95 | 0.27 | 0.75 | 0 | 0.73 | 0.45 | 0.85 | 0.69 |
| 90% | 0.86 | 0.21 | 0.81 | 0.09 | 0.78 | 0.53 | 0.88 | 0.69 |
| 100% | 0.82 | 0.16 | 0.83 | 0.16 | 0.78 | 0.57 | 0.89 | 0.69 |

17. The method according to claim 10, wherein the coordinates (u, v) of each point forming an intermediate thick airfoil profile having an intermediate relative thickness t/c lying between lower and upper relative thickness $(t/c)_{min}$ and $(t/c)_{max}$ are defined by interpolation from a first airfoil profile having the lower relative thickness $(t/c)_{min}$ and a second airfoil profile having the upper relative thickness $(t/c)_{max}$.

18. The method according to claim 17, wherein the ordinate coordinate v of each point of the intermediate thick airfoil profile of relative thickness t/c is determined by the following relationship:

$$v = \frac{\left(\frac{t}{c}\right) - \left(\frac{t}{c}\right)_{min}}{\left(\frac{t}{c}\right)_{max} - \left(\frac{t}{c}\right)_{min}} v_{max} + \left(1 - \frac{\left(\frac{t}{c}\right) - \left(\frac{t}{c}\right)_{min}}{\left(\frac{t}{c}\right)_{max} - \left(\frac{t}{c}\right)_{min}}\right) v_{min}$$

$v_{min}$ being a first ordinate coordinate for a point of the first airfoil profile having the same abscissa coordinate u as the point of coordinates (u, v) of the intermediate airfoil profile (11), and $v_{max}$ being a second ordinate coordinate for a point of the second airfoil profile having the same abscissa coordinate u as the point of coordinates (u, v) of the intermediate thick airfoil profile.

19. The method according to claim 10, wherein the method includes a simulation first additional step for simulating the aerodynamic behavior of the airfoil profile when it is swept by a first air stream from the leading edge towards the trailing edge and when it is swept by a second air stream from the trailing edge towards the leading edge.

20. The method according to claim 10, wherein the method includes a definition second additional step for defining the thick airfoil shape by combining airfoil profiles defined during the determination step of determining the airfoil profile.

* * * * *